United States Patent
Perkins

(10) Patent No.: US 11,042,514 B2
(45) Date of Patent: Jun. 22, 2021

(54) COLLABORATION COMPUTER SYSTEM

(76) Inventor: Graeme Perkins, St. Kilda (AU)

(*) Notice: Subject to any disclaimer, the term of this patent is extended or adjusted under 35 U.S.C. 154(b) by 1299 days.

(21) Appl. No.: 14/240,077

(22) PCT Filed: Aug. 23, 2012

(86) PCT No.: PCT/AU2012/000985
§ 371 (c)(1),
(2), (4) Date: May 6, 2014

(87) PCT Pub. No.: WO2013/026096
PCT Pub. Date: Feb. 28, 2013

(65) Prior Publication Data
US 2014/0304221 A1  Oct. 9, 2014

Related U.S. Application Data

(60) Provisional application No. 61/526,357, filed on Aug. 23, 2011.

(51) Int. Cl.
*G06F 16/21* (2019.01)
*G06Q 10/06* (2012.01)

(52) U.S. Cl.
CPC .......... *G06F 16/21* (2019.01); *G06Q 10/067* (2013.01); *G06Q 10/0633* (2013.01)

(58) Field of Classification Search
CPC ......... G06F 17/30286; G06F 17/30067; G06F 3/067; G06F 17/30575; G06F 16/21; G06Q 10/10; G06Q 10/067; G06Q 10/0633

(Continued)

(56) References Cited

U.S. PATENT DOCUMENTS 6,067,548 A * 5/2000 Cheng .................. G06Q 10/10
6,415,297 B1 * 7/2002 Leymann .............. G05B 17/02
                                                            707/608

(Continued)

FOREIGN PATENT DOCUMENTS

CN      1302413 A      7/2001
CN      1351299 A      5/2002

(Continued)

OTHER PUBLICATIONS

Supplemental European Search Report for EP Application No. 12 82 5807 dated Jan. 8, 2015 (13 pages).

(Continued)

*Primary Examiner* — Michael Pham
(74) *Attorney, Agent, or Firm* — Merchant & Gould P.C.

(57) ABSTRACT

A collaboration computer system including a database system and a processing system for communicating with the database system. The database system maintains (i) user data representing users; (ii) model data representing process models of respective processes and defining steps and associated users of each process; (iii) touch point data representing connections between steps of different independent processes; and (iv) state data associated with steps of instances of the processes. The processing system includes a user module to associate users with respective user data; a model module to generate user interfaces for users to create the process models and generate the model data, and associate processes to users, independently of other users; and an instance module to generate and operate instances of the processes based on the models and monitor state changes of the steps in parallel based on the state data, and generate notification message data based on the touch point data on state change of a connected step.

19 Claims, 25 Drawing Sheets

(58) Field of Classification Search
USPC .................................................. 707/609, 608
See application file for complete search history.

(56) References Cited

U.S. PATENT DOCUMENTS

| | | | | |
|---|---|---|---|---|
| 8,103,536 | B2* | 1/2012 | Green | G06Q 10/06 705/7.27 |
| 2003/0167339 | A1 | 9/2003 | Zhu et al. | |
| 2003/0233372 | A1* | 12/2003 | Warner | G06F 17/3089 |
| 2004/0083448 | A1* | 4/2004 | Schulz | G06Q 10/06 717/101 |
| 2005/0049961 | A1 | 3/2005 | Hansen | |
| 2005/0283786 | A1* | 12/2005 | Dettinger | G06Q 10/0633 718/104 |
| 2006/0106846 | A1* | 5/2006 | Schulz | G06Q 10/10 |
| 2006/0161272 | A1* | 7/2006 | Haller | G06Q 10/06 700/29 |
| 2008/0256172 | A1* | 10/2008 | Hebert | G06Q 10/10 709/202 |
| 2010/0223557 | A1* | 9/2010 | Kenney | G06Q 10/10 715/736 |
| 2011/0113008 | A1* | 5/2011 | Jafri | G06F 17/30867 707/608 |

FOREIGN PATENT DOCUMENTS

| | | | |
|---|---|---|---|
| CN | 1943219 A | 4/2007 | |
| WO | WO 2004/013784 | 2/2004 | |
| WO | WO-2004013784 A2 * | 2/2004 | ............. G06Q 10/06 |

OTHER PUBLICATIONS

Anonymous: "Microsoft-Project—Wikipedia, the free encyclopedia" (Jul. 28, 2011) retrieved from: http://en.wikipedia.org/w/index.php?title=Microsoft_Project&oldid=441941980.

International Search Report for International Application No. PCT/AU2012/000985 dated Sep. 21, 2012 (3 pages).

First Chinese Office Action for corresponding Chinese Patent Application No. 201280051371.1 dated Jul. 18, 2016, 20 pages.

Second Chinese Office Action for corresponding Chinese Patent Application No. 201280051371.1 dated Mar. 27, 2017, 13 pages.

* cited by examiner

FIGURE 19

COLLABORATION COMPUTER SYSTEM

This application is a National Stage Application of PCT/AU2012/000985, filed 23 Aug. 2012, which claims benefit of U.S. Provisional Ser. No. 61/526,357, filed 23 Aug. 2011 and which applications are incorporated herein by reference. To the extent appropriate, a claim of priority is made to each of the above disclosed applications.

FIELD

The present invention relates to a collaboration computer system that can assist users with completing independent, yet related, tasks efficiently and in parallel.

BACKGROUND

Tasks that involve a multiple step process, and which require a number of participants to diligently complete the steps within specific time frames, can be monitored and controlled by computer systems. For example, practice management computer systems have been developed that clearly define the task process as a workflow or set of workflows to be completed by one or more participants. A workflow can define a step or steps in the process and also define timed events that are monitored or policed to ensure they are completed. A practice management system of this type enables a number of users to log in as participants, and in a broad sense, collaborate to complete a task, but the process is strictly controlled by the management system according to the workflow which constrains the users. For example, defining a specific workflow that requires the steps to be completed one after the other, or serially, restricts completion of the task as each user participating has to wait until each step of the process is performed. The participants cannot act independently.

Many organisations also have their own practice management or task management systems that have been developed and/or configured to cater for the specific tasks that the organisation performs on a regular basis. The systems, whilst adequately managing tasks within an organisation, are not designed to work with the systems of other organisations. A task, such as producing a product, completing a conveyance of property, building a manufacturing plant, or transferring sensitive material between jurisdictions, may need to be completed by different persons using different practice, project or task computer management systems, yet none of the systems will provide an overview of the entire task to be completed and the progress or status of each step. A collaboration system should provide true collaboration between multiple parties regardless of the management computer systems they already employ or the organisational structures with which they are associated. The collaboration system should also be able to provide allocation of temporal steps that need to be completed by various persons and existing management computer systems to execute a task, but yet allow those persons and computer systems to still operate independently.

Accordingly, it is desired to provide a computer system that provides a technical solution to address the above, or which at least provides a useful alternative.

SUMMARY

Embodiments of the present invention provide a collaboration computer system, including:

a database system for maintaining:
(i) user data representing users;
(ii) model data representing process models of respective processes and defining steps and associated users of each process; and
(iii) touch point data representing connections between steps of different independent processes; and
(iv) state data associated with steps of instances of said processes;

a processing system for communicating with the database system and including:
(a) a user module to associate users with respective user data;
(b) a model module to generate user interfaces for users to create the process models and generate the model data, and associate processes to users, independently of other users; and
(c) an instance module to generate and operate instances of said processes based on said models and monitor state changes of the steps in parallel based on the state data, and generate notification message data based on said touch point data on state change of a connected step.

Advantageously, whilst the model proposes one or more possible sequences of steps to be completed to complete the task, users perform the steps independently and, depending on the steps to be completed, may complete steps sequentially or in a different order, where one step is not dependent on the other.

The processing system may generate user interfaces which accesses the user and state data to display report data representing state of completion of a step, and a performance of each user.

The processing system may access the touch point data, on state change of an associated connected step, to generate and send messaging data to advise another user that the connected step has changed state, and adjust the state data for the other connected step. The processing system triggers an event for each state change on a step, generating and sending message data related to the event. The processing system accesses touch point data to determine whether a connected step, if any, should process the message. The processing system adjusts the state data of the connected step to indicate the state change on the other step.

Embodiments also provide a collaboration computer system, including:
a model module to create and edit process models representing respective independent processes and to establish data sharing relationships between pairs of steps of said independent processes; and
an instance module to invoke and operate process instances in parallel based on said models and to activate said relationships;
wherein users of said system are associated respectively with said process instances and complete a task comprising steps of said process instances using data shared between pairs of said steps.

Embodiments also provide a collaboration process, executed by a computer system, including:
generating process models representing respective independent processes;
generating touch point data representing relationships between steps of said independent processes;
operating instances of said processes in parallel based on said models; and activating data connections between steps of different instances based on said touch point data.

DESCRIPTION OF THE DRAWINGS

Embodiments of the present invention are described herein, by way of example only, with reference to the accompanying drawings, wherein:

FIG. 19 is a user interface system for accessing touch point data associated with a step of a process model;

DETAILED DESCRIPTION

Figure 1:
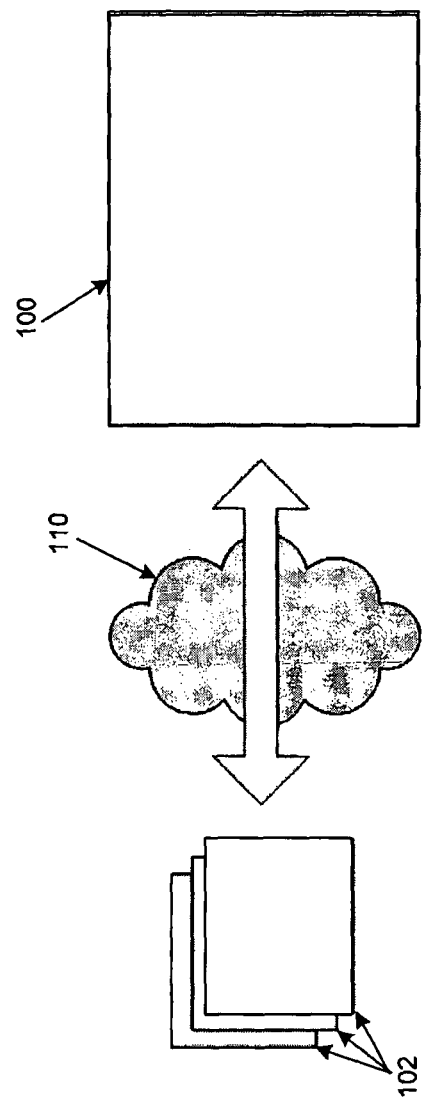
FIG. 1 is an overview block diagram of an embodiment of a collaboration computer system connected to a number of clients.

A collaboration system 100, as shown in FIG. 1, supports a parallel process collaboration service that enables a number of different clients 102 to operate independently and in parallel, yet at the same time interact or collaborate to complete a task that requires associated processes to be completed by the clients 102. A client 102 is typically a management computer system of an organisation, but may simply be a client software application running on a computer. The clients 102 communicate with the collaboration system 100 over a computer communications network 110, such as the Internet. A number of different clients 102 may communicate with the collaboration system 100, and different clients 102 may access and modify the same data records managed by the system 100.

Figure 2:
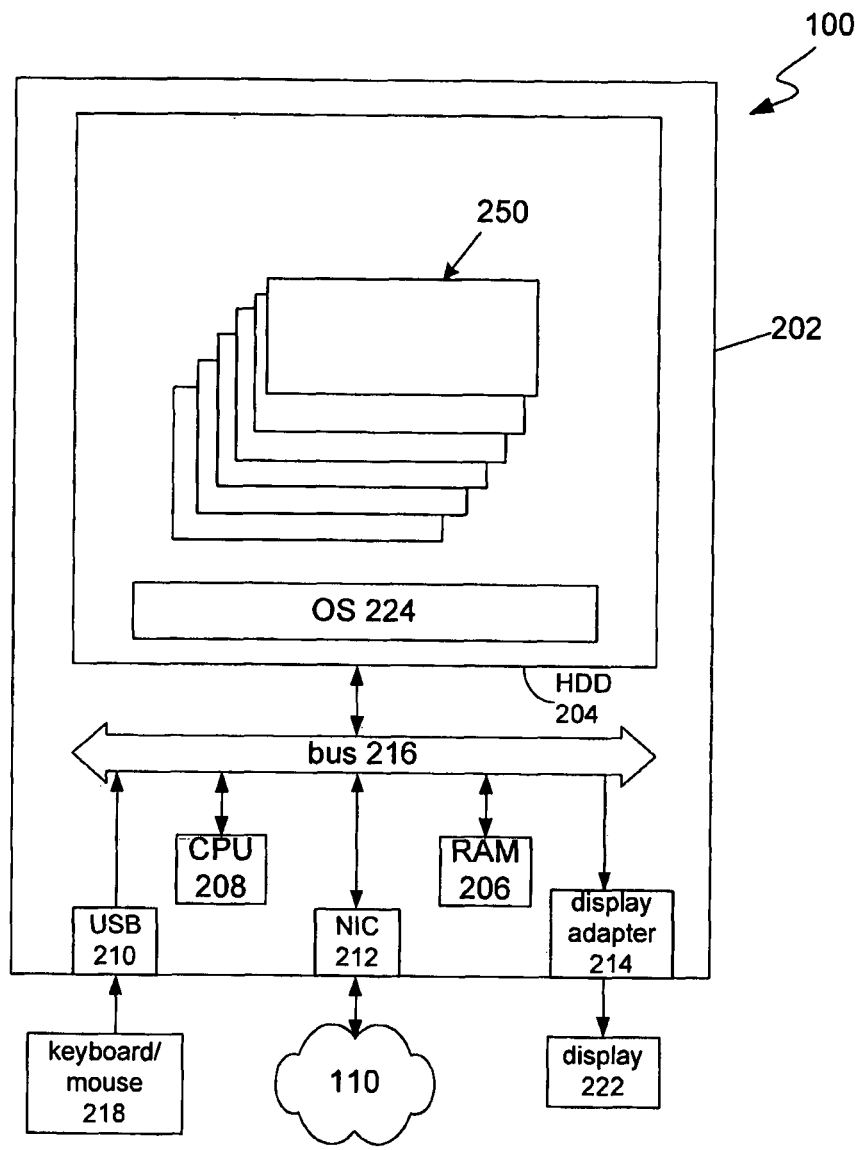
FIG. 2 is a block diagram of components of the collaboration computer system.

The collaboration system 100 is a computer system and, as shown in FIG. 2, may be based on a standard computer 202, such as a 32 or 64 bit Intel architecture computer produced by Lenovo Corporation, IBM Corporation, or Apple Inc. The data processes executed by the computer system 202 are defined and controlled by computer program instruction code and data of software components or modules 250 stored on non-volatile (e.g. hard disk) storage 204 of the computer 202. The processes performed by the modules 250 can, alternatively, be performed by firmware stored in read only memory (ROM) or at least in part by dedicated hardware circuits of the computer 202, such as application specific integrated circuits (ASICs) and/or field programmable gate arrays (FPGAs).

The computer 202 includes random access memory (RAM) 206, at least one microprocessor 208, and external interfaces 210, 212, 214 that are all connected by a system bus 216. The external interfaces include universal serial bus (USB) interfaces 210, a network interface connector (NIC) 212, and a display adapter 214. The USB interfaces 210 are connected to input/output devices, such as a keyboard and mouse 218. The display adapter 214 is connected to a display device, such as an LCD display screen 222. The NIC 212 enables the computer 202 to connect to the communications network 110. The network 110 may include one or a combination of existing networks 130, such as a LAN, WAN, the PSTN, the Internet, mobile cellular telephone networks, etc. The computer 202 includes an operating system (OS) 224, such as Microsoft Windows, Mac OSX or Linux. The modules 250 all run on the OS 224, and include program code written using languages such as C, Ruby or C#.

Figure 3:
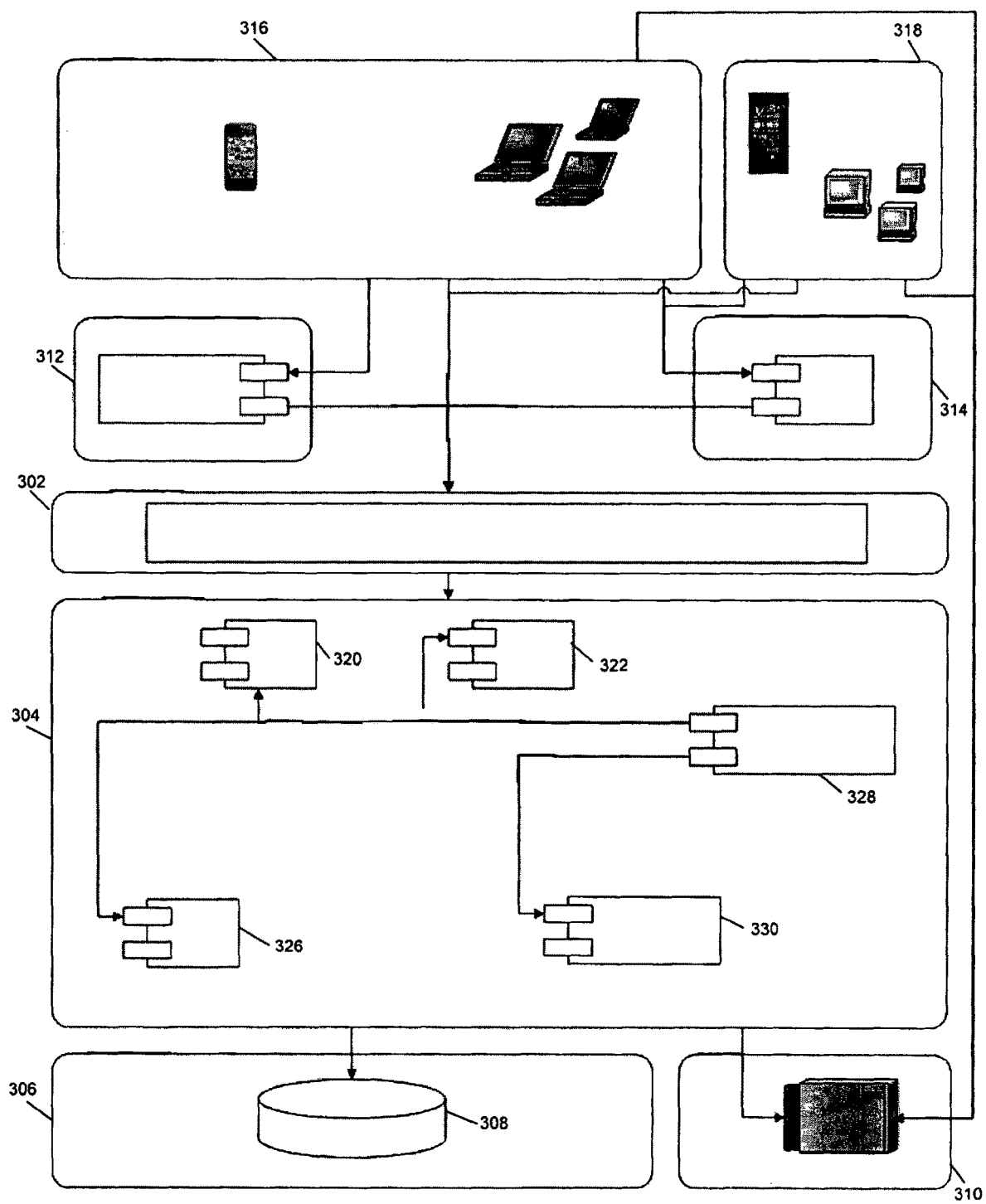
FIG. 3 is a block diagram of the architecture of the collaboration system.

The modules 250 provide a resource orientated architecture, as shown in FIG. 3, that includes a Client API (application programming interface) 302, a service tier 304 to support Web services, and a data tier 306 to provide a database 308 and other required file storage such as a Cloud data centre 310.

The Client API supports representational state transfer (REST) URI based request routing, and the modules 250 of the architecture also includes Web proxy code 312 and application proxy code, 314 that can assist clients 102 with access to the Client API. The clients 102 include generic clients 316 that are authorised to access all data for all users of the parallel process collaboration service provided by the system 100, and third party API clients 318 that users can authorise to access all or some of their data.

The service tier 304 includes the following Web services modules to support the services:
 (i) Core Services 320 to support the core processes of the parallel process collaboration service;
 (ii) Security Services 322, such as authentication of users;
 (iii) Log Services 326 to maintain transaction logs;
 (iv) Internal Routing Services 328 to support routing of messages within the system 100; and (v) Communication Services 330 to support communication to users, such as notifications.

The Client API 302 is a resource oriented interface for programmatic interaction between a client 102 and the service 100. The interface 302 exposes a set of named web resources that correspond to particular services 320 to 330 in the overall service 100. The Client API is designed to be an efficient and optimised approach for supporting multiple clients solutions, such as mobile and web clients. It allows clients 102 to execute applications using API's and other data sources in combination with the Client API 302.

The Client API 302 is an interface to the Core Services 320. It brokers the client's requests and responses to the Core Services 320. Clients 102 format their requests to the service according to the notation specified by the interface 302. The interface enables a client to interpret data managed by the service 100 as data representing the various elements of process collaboration.

A developer of any $3^{rd}$ party API client 318 who is registered as a user of the service 100, registers the client 318 using a secure registration process that involves generating an API key that is unique to one of the developer's groups. The key is supplied when the client 318 attempts to access the service 100. The service 100 assigns privileges to the client API key, which allows the client access only to the services required.

The API 302 supports web applications, mobile applications, and direct computer system to computer system interactions. The API 302 includes proxy code 314 for these different types of applications, which further simplifies how clients can use the Client API 302 to exchange data with the service 100.

Figure 4:
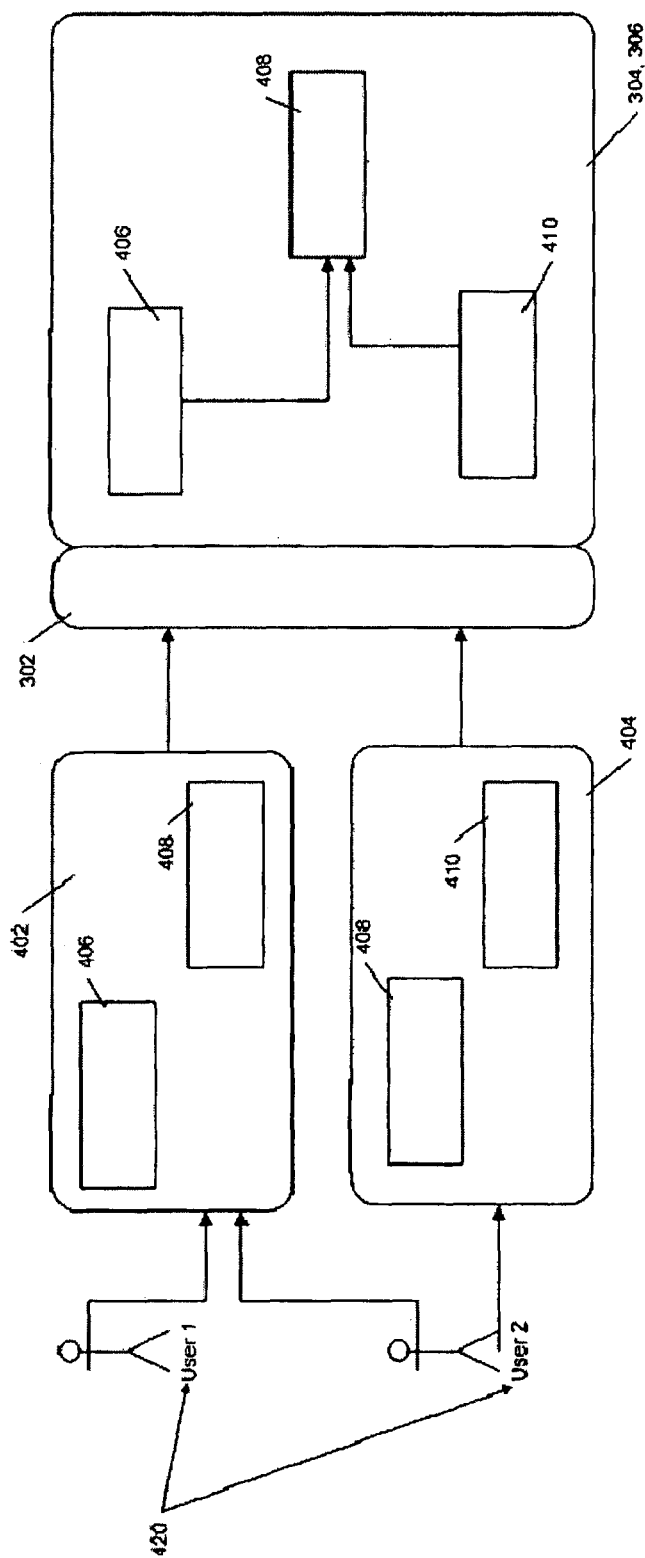
FIG. 4 is a diagram of clients connecting to an application programming interface (API) of the collaboration system.

A significant advantage of the service 100 is that a user 420, as shown in FIG. 4, can access unrelated clients 402 and 404 with one set of user identification data. In addition, a user can access the same and different process state data in unrelated clients 102. As shown in FIG. 4, User 2 operates Client 402 and Client 404. User 2's actions in Client 402 and actions in Client 404 are attributed to the single user identity for User 2. Also, User 2 can interact with the same Process 408 state data in Client 402 or in Client 404. For example, where a Process 410 is executed on a Lender's system 404 by a User 2 to complete a loan approval process, and User 1 and User 2 work on Solicitor's system 402 to complete a Process 406 and a Process 408 associated with the property conveyance process, User 2 may also work on a Process 408 in the Lender's system 404.

The modules 250 of the collaboration system 100 include a number of different processing modules and data storage modules, which can be combined, separated or distributed over the network 110.

Figure 5:
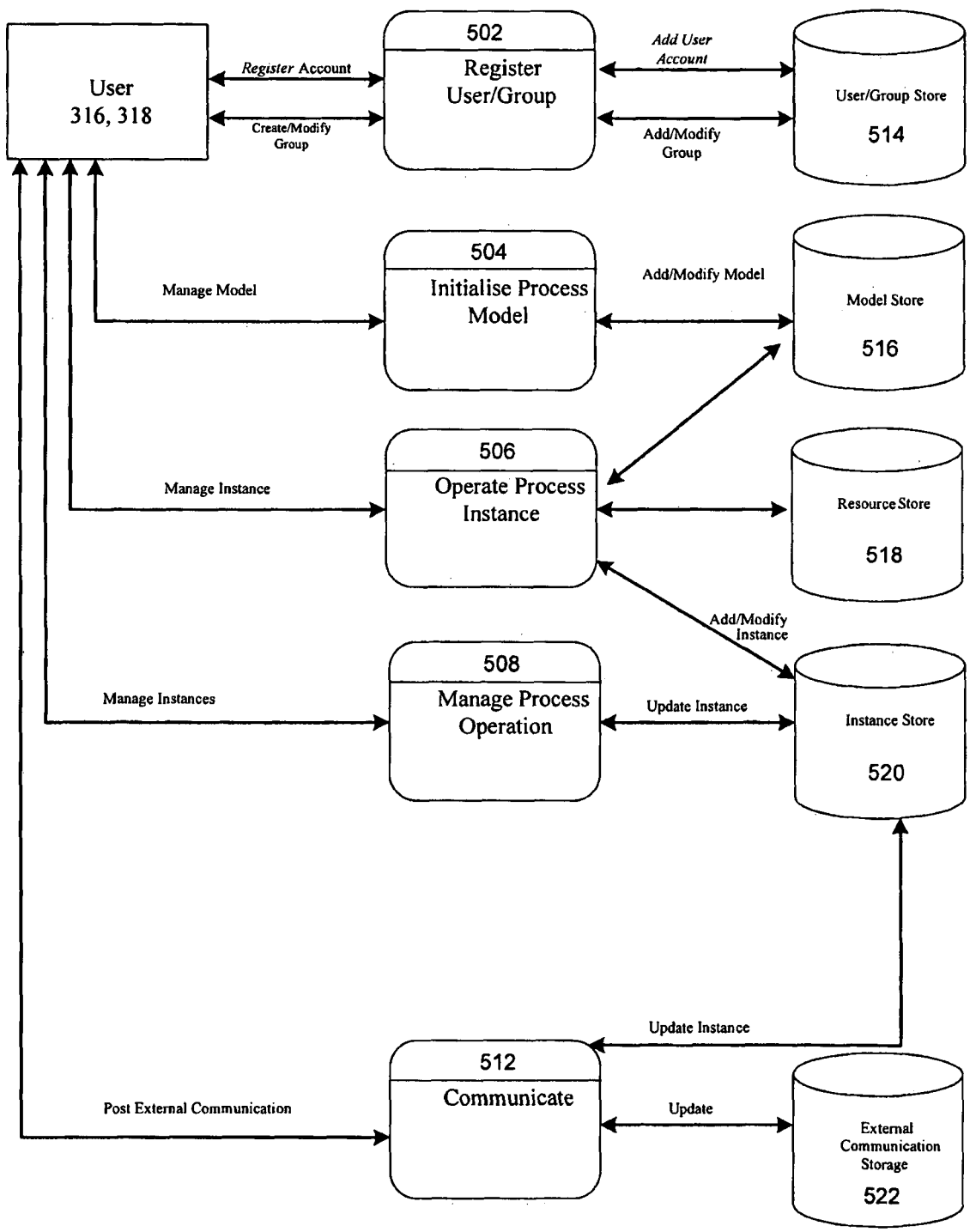
FIG. 5 is an architecture diagram of service modules of the collaboration system.

The processing modules, as shown in FIG. 5, include:
(i) a Register User/Group module 502;
(ii) an Initialise Process Model module 504;
(iii) an Operate Process Instance module 506;
(iv) a Manage Process Operation module 508; and
(v) a Communicate module 512.

The data storage modules include:
(i) a User and Group Store module 514 that operates with the Register User/Group module 502;
(ii) a Model Store module 516 that operates with the Initialise Process Model module 504;
(iii) a Resource Store module 518 that operates with the Operate Process Instance module 506;
(iv) an Instance Store module 520 that operates with the Operate Process Instance 506, the Management Process Operation 508, and the Communicate module 512; and (v) an External Communications Storage module 522 that operates with the Communicate module 512 to provide Cloud and other data storage.

The Register User/Group module 502 is configured to receive and store data in the Store 514 on a User, such as, account details including user name, personal profile details, details about groups of affiliated users, and details about teams of affiliated group members. A person, who may act as an agent, is recorded as a unique User of the service 100 by allocation of unique user identification data and may be associated with other Users to support parallel process collaboration. This includes supporting the different ways users may be affiliated when acting as agents in a process, such as employees in a company organising themselves into different teams or workgroups to work on shared tasks. Accordingly the module 502 enables a Group to be established that includes and is associated with a number of Users. A Group is used to represent a company or organisation, such as a law firm or lender. Users that are associated with the Group may be, for example, employees and defined by the system as members of the Group.

The Initialise Process Model module 504 exchanges data with a User accessing a client 316, 318 about the intended operation of a type of process. The Initialise Process Model module is coupled with the Model Store module 516 so it can store data representing a model of the process. The process may complete a task or be part of a task. The User sends different types of model data about a process to the Initialise Process Model module 504 for processing and storage in the Model Store module 516. The model defines the steps of the process, and how those steps relate to each other. The model is also used to define:

1. Events that occur in the process;
2. Data fields associated with the process;
3. Rules that determine how the steps may flow. The rules are program code which can be triggered and invoked by events of the process;
4. Types of users who will play a role in the process; and access permissions assigned by default to the users who will play a role in the process;
5. Touch points in other processes. A touch point is data associated with a step that refers to another step of another independent process. The touch point associates the two steps so when the state of one changes it triggers a message notification to the other step.

A User establishes a model of a process using the Initialise Process Model module 504. The model can be associated or hosted by a Group associated with the User. Users who are not members of the Group can request to join a Network of the Group. A Group's Network includes Users and Groups who are not members of the Group. A User who belongs to a Group's Network can request access to view a process model that is hosted by the Group. A User of the Group's Network can then request and be established as a Subscriber to a selected model, as described in more detail below. Once established as a Subscriber, provided the privacy settings for the Subscriber are configured to allow it, the User can create and establish a touch point between selected steps of the Group's models and selected steps of models hosted by the User or the User's Group. Association of a User with a Group, a Network and configuration as a Subscriber, is controlled by the Register User/Group module 502, and the Initialise Process Model module 504 uses the data of the store 514 to control access to models and creation of touch points.

The Operate Process Instance module 516 exchanges data with the User relating to the operation of an instance of a process, including data to instantiate aspects of the model such as messages about step state changes, events, data fields, Users and Groups who play a role in the process, access permissions and touch points to other processes. The Operate Process Instance module 516 is coupled to the Model Store module 516 so it can relate the messages to the corresponding aspects of the process model. The Operate Process Instance module 506 is also coupled with the Instance Store module 520, to store data corresponding to the history of the operation of an instance of a process. The Operate Process Instance module 506 provides an audit trail for the operation of a process. This audit trail can be presented to authorised Users who have access to the process instance in order to facilitate collaboration on the process, for example in a user interface of a client 102 that uses the Client API 302. Importantly, where there are touch points, this audit trail includes data about the touch point steps in the context of a process instance for Users associated with or who subscribe to the instance as Subscribers. A User of a Group is able to start an instance of a process model of the Group by entering and providing data that the model requires to invoke and commence an instance. For example, the data fields that may be required to be entered include a name of the process instance, a description of a process instance, and data for the requisite data fields of the model.

The service provided by the collaboration system 100 allows for collaboration based on other types of data, apart from the core data used to instantiate aspects of the model. Users of the service may share documents and other digital resources from outside of the service 100. The Operate Process Instance module 516 is coupled to the Resource Store module 518 which is used to store the resources obtained from outside the system 100.

The Manage Process Operation module 508 provides tools to control the operation of a number of instances of a process that have been invoked and recorded in the Instance Store 520. The tools include report generation and notification mechanisms to manage a set of process instances associated with a User. Whilst the Process Instance module 506 is focused around the operation of an instance, the Process Operation module 508 operates on data of different instances. For example, the Process Operation module 508 may be used to provide a report on all steps completed by a User over the last six months, which displays data on the number of times that User has completed a step in that period.

The Initialise Process Model 504, Operate Process Instance 506 and Register User/Group 502 modules are also coupled with the Communicate module 512. The Communicate module 512 stores and processes notification messages defined in the service 100 and any user defined notification messages defined in a process model of a process and triggered in the operation of an instance of the process. The Communicate module 512 handles communications with other computer systems and devices using various communications protocols, such as SMTP and HTTP. The Communicate module 512 is coupled with the External Communication Storage module 512 so it can first store the message data related to the notification, then process the communication asynchronously.

The collaboration system 100 can be used to enable a number of different clients 102 to interact to complete a wide variety of tasks, where the clients 102 may be independently used to complete different processes that each need to be executed to complete an overall task.

Figure 6:
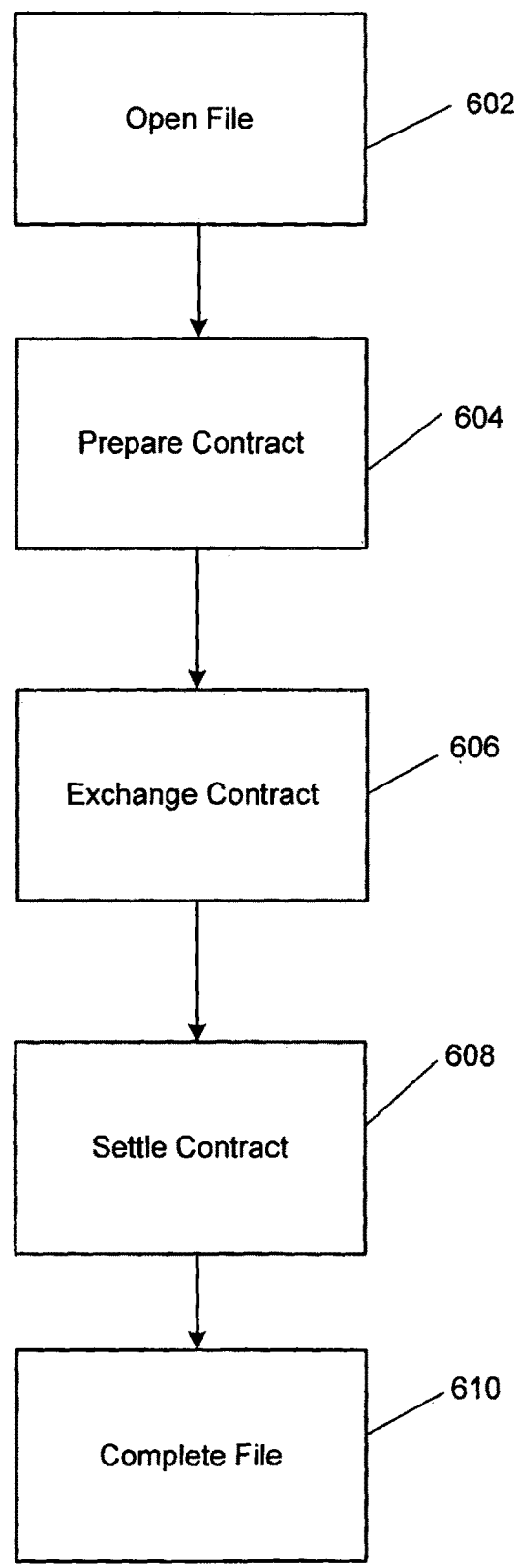
FIG. 6 is a flow diagram of a property conveyance process.

To illustrate how the collaboration system 100 operates, the following gives an example of completion of a property conveyance task that requires collaboration between a number of entities, in particular in this case law firms and a lender, such as a financial institution. For example, the steps of a process a law firm acting for the seller of the property typically needs to complete, as shown in FIG. 6, includes: open file 602, prepare contract 604, exchange contract 606, settle contract 608, and complete file 610.

To use the service 100, employees at the law firm must register as Users. To register, employees interact with the service 100 using a client 102 (316, 318) that uses the Client API 312 to access the service 100. To register, an employee of the seller's law firm submits data using a served user interface of the Register module 502 to enable them to authenticate who they are each time they access the service 100 as a User. The user is then able to create a Group, which, as discussed above, is an entity defined by the service 100 to represent a collection of affiliated or associated Users. In this example, the Group represents the employees of the law firm. When creating the Group the user can also invite all the other employees to register as Users. These users then join the Group after accepting the invitation. A first user can have privileged access to all functions in the service 100, and an additional registration step for the first user may be to assign the correct privileges to the other users.

Figure 7:
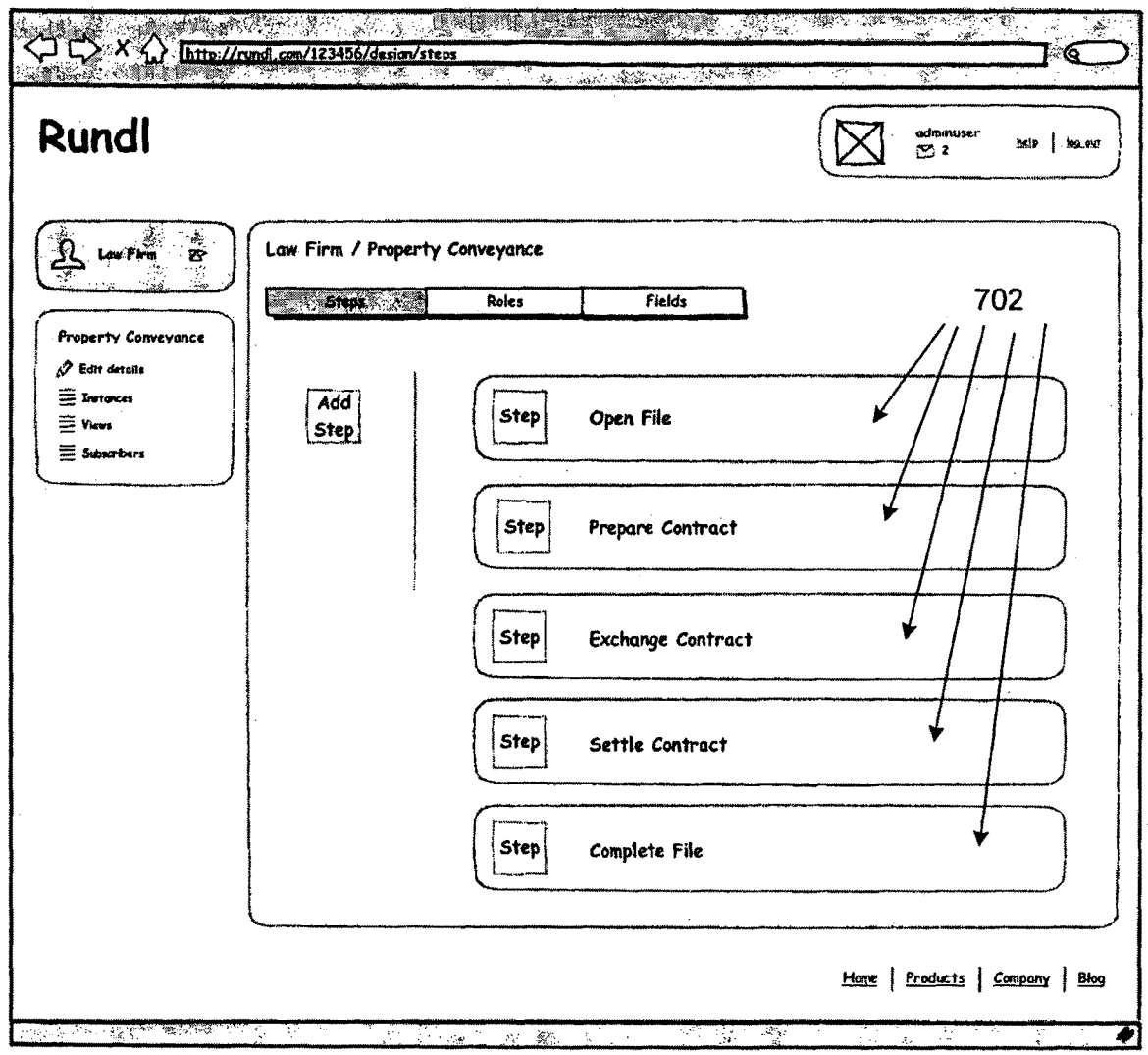
FIG. 7 is a user interface of the system for creating a process model.

To prepare for collaboration using the service, a User of the law firm must first model or define each step 602, 604, 606, and 608 of its process using a client 102. The client 102 is served user interface code to generate an interface, as shown in FIG. 7, to enter data to define a model of the process. In this example the user created a process model called Property Conveyance, and then added each step 702 in the law firm's property conveyance process sequentially.

Figure 8:
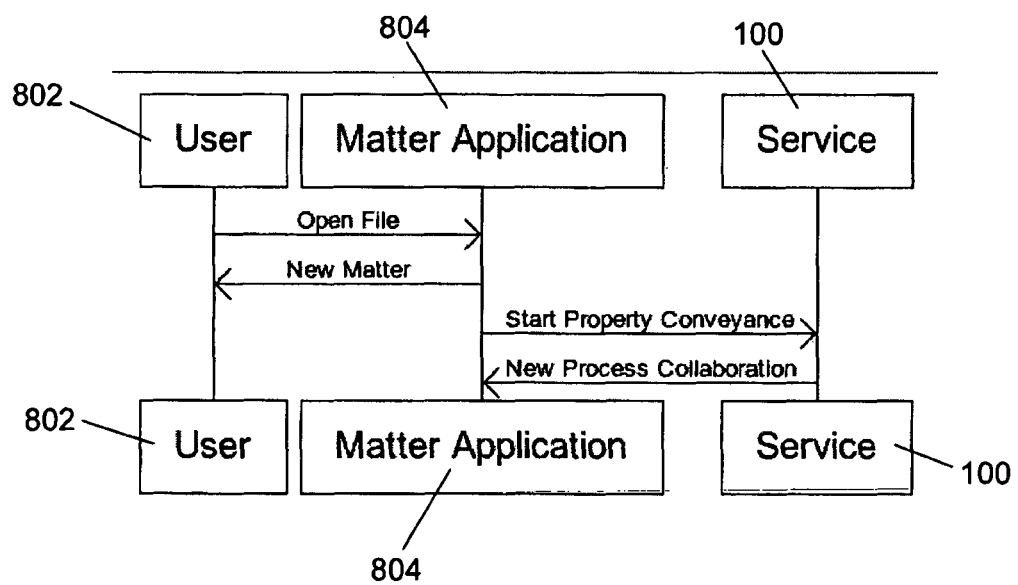
FIG. 8 is a flow diagram of messages between the system and a matter management system when generating a process instance.

Once the process model is initialised, the law firm can reconfigure its internal matter applications of its matter management system to be a client 102 of the service 100. A client 102 is able to send a request to the service 100 and handle a response. These requests and responses relate events in the matter applications to events defined in the service 100. The data exchanged in the requests and responses is the basis for collaboration between Users around the operation of an instance of a defined process. For example, a new Property Conveyance process collaboration instance in the service 100 can be invoked each time a User completes the Open File step in the matter application, as shown in FIG. 8.

The User 802 is primarily concerned with the Open File step of their usual process in the matter application 804. The matter application 804, now a client 102, handles in the background the request to the service 100 to start an instance of the Property Conveyance process. A Start. Property Conveyance event message is generated and sent to the service 100 and this is transparent to the User.

Figure 9:
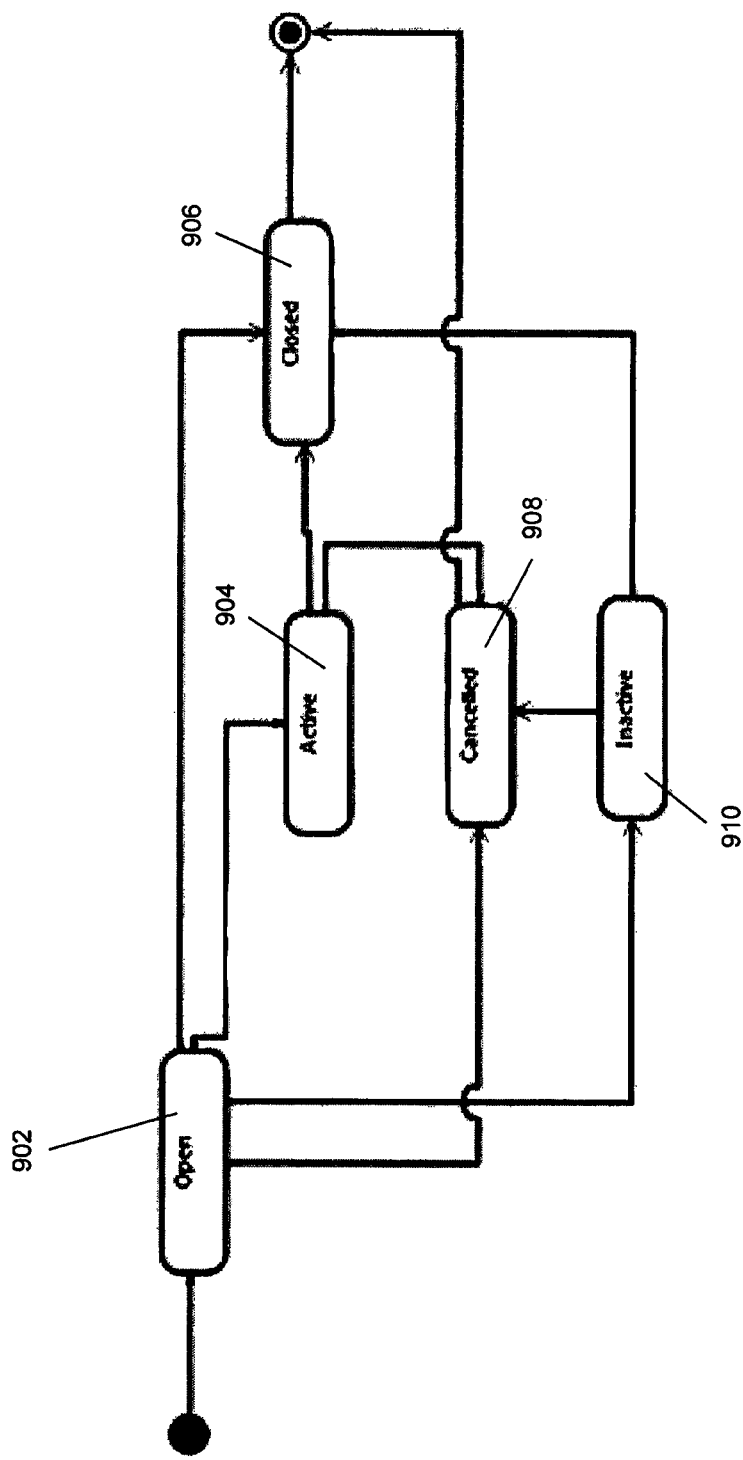
FIG. 9 is a state diagram of states of a step of a process instance.

Once the instance is started, the exchange of data by the parallel process collaboration system 100 relates to events, such as events that change the state of steps in the process model. FIG. 9 shows a state diagram for the states of a single step of a process model. Initially all steps in an instance of a process are set to an Open state 902. An Open step 902 is available to register events, and the expectation is that there will be events occurring within the context of that step at some time in the future. An Active step 904 is the earliest step in the process that is not Closed 906 or Cancelled 908. The Active step 904 moves progressively to subsequent steps in the process as the state of steps are Closed or Cancelled. Closed means a step is completed, and Cancelled means a step does not have further events in a current instance of the process. In some cases there can be multiple Active steps in a process. This occurs when the process model has complex constructs like concurrent steps, splits, merges and loops. In complex cases there are also Inactive steps 910. Inactive means the step cannot be reached, such as when it sits deep within a split construct.

However, in the parallel process method executed by the collaboration system 100, any step remains available to register events, even after its state changes to Closed 906. Unlike workflow methods, this non-linear flow of events allows Users to engage in flexible process collaboration.

Figure 10:
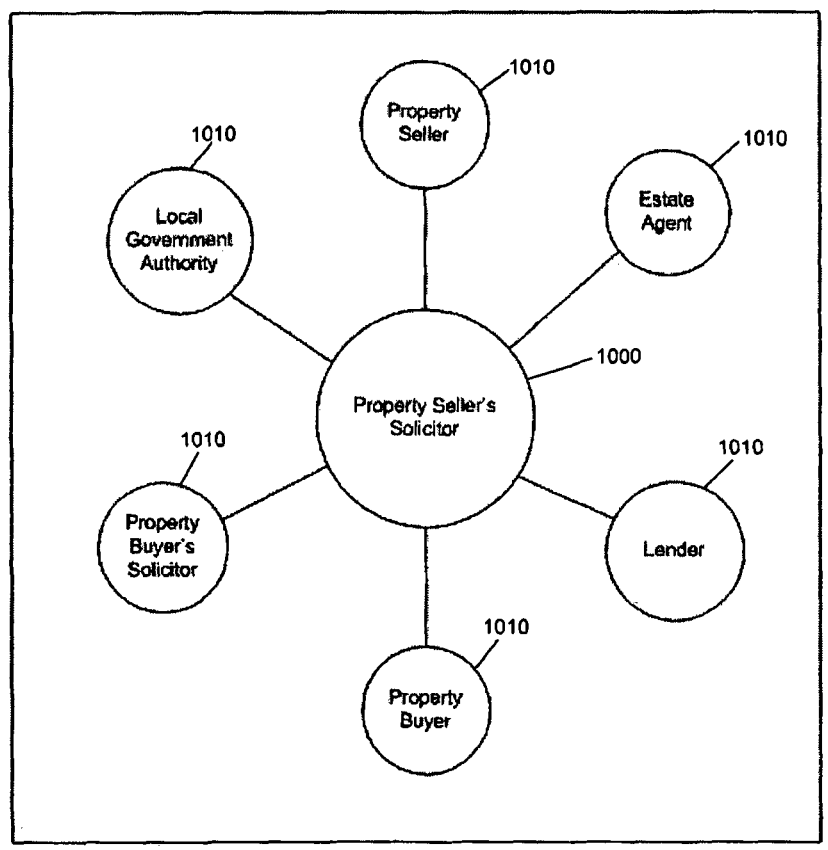
FIG. 10 is a diagram of users associated with a property conveyance process.

In the property conveyance process example, the matter application associated with the User 1000 can communicate with the matter or task management computer systems 316, 318 of other stakeholders 1010, as shown in FIG. 10, either directly or via the service while the User ensures their allocated steps of the process are executed.

Due to the large number of persons and organisations the law firm interacts with, the matter management system stores a database of contacts, as well as the associations between contacts and matters. After reconfiguration as a client 120, the matter application of the management system associates persons or organisations that may be associated with or connected to the process collaboration instance.

Figure 11:
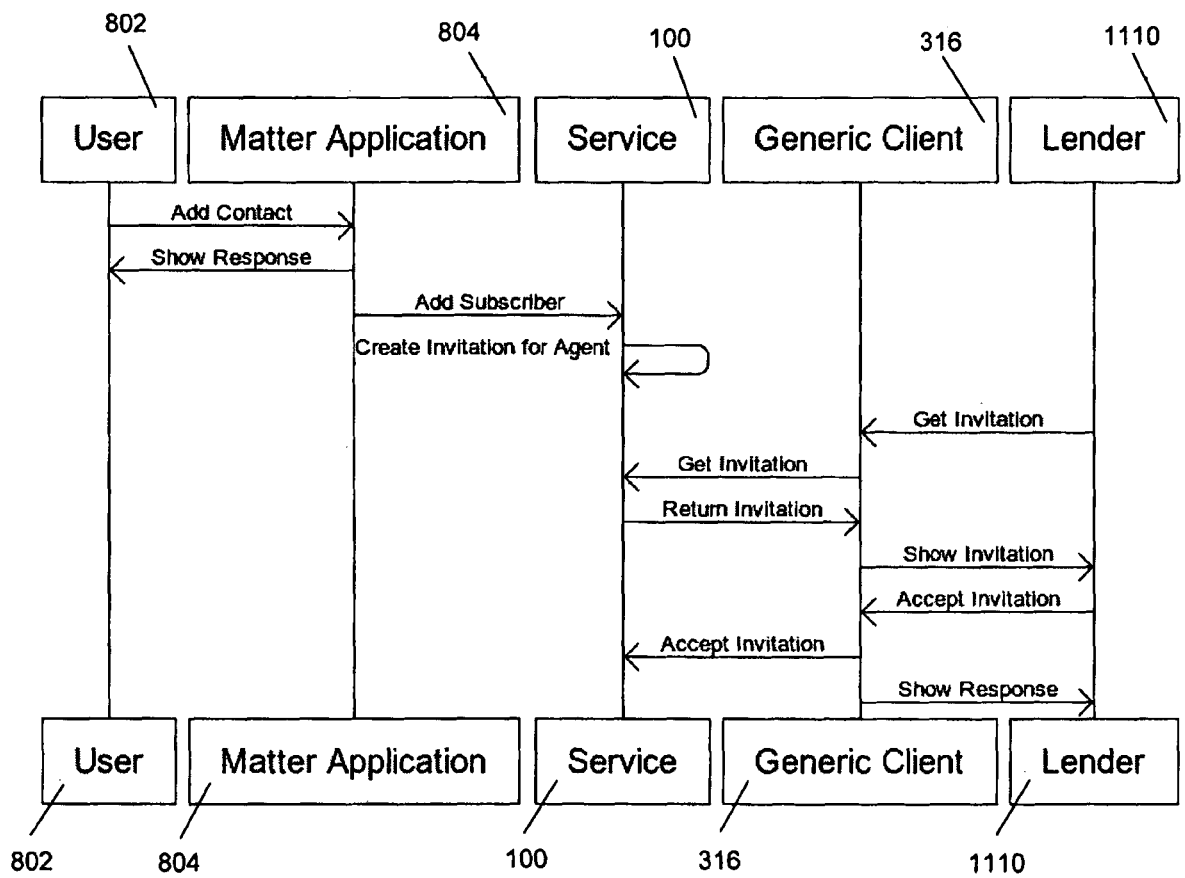
FIG. 11 is a flow diagram of messages between the collaboration system, a matter management system, and clients of the collaboration system when adding a subscriber to a process model.

A Lender User 1110, of a financial institution, can be associated as a Subscriber with an instance of the Property Conveyance process as shown in FIG. 11. The Law Firm Matter Application User 802 adds a matter stakeholder as a Contact in the Matter Application 804. The matter application 804 then triggers, via the service 100, an invitation to the Lender User 1110 to participate in the process collaboration. The Lender 1110 views the invitation in a client 316, 318 built for the purpose of participating in any process collaboration. In this example, the Law Firm User 802 invites a lender institution to collaborate and a representative, being the Lender User 1110, accepts.

Figure 12:
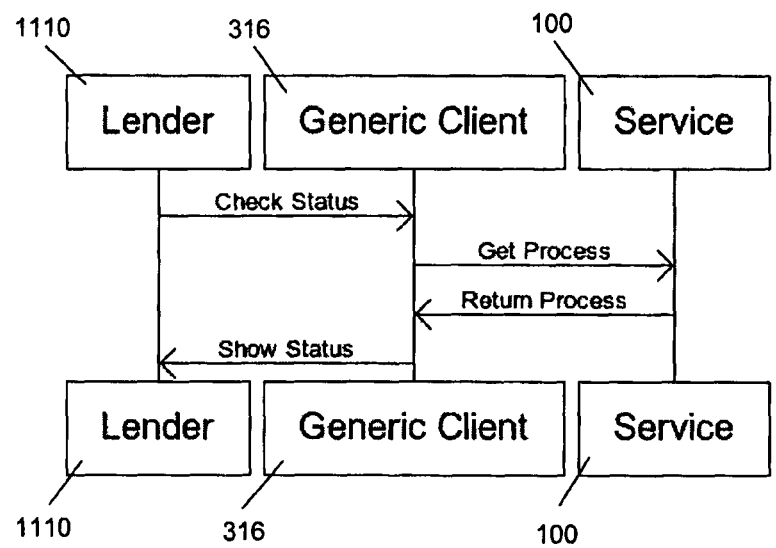
FIG. 12 is a flow diagram of messages between the system and a client when communicating state data of a process instance.
Figure 13:
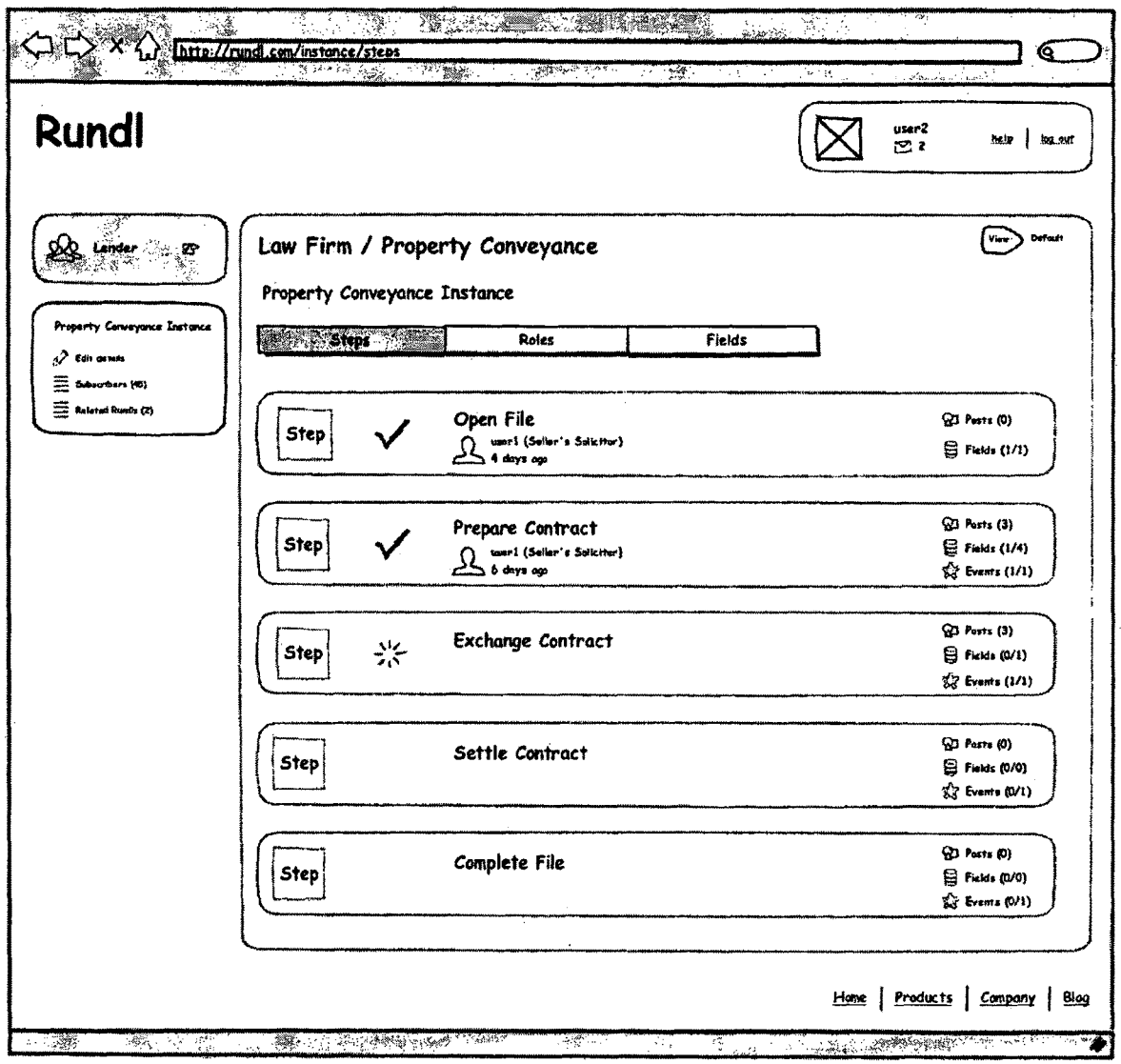
FIG. 13 is a user interface system for accessing state data of steps of the process instance.
Figure 14:
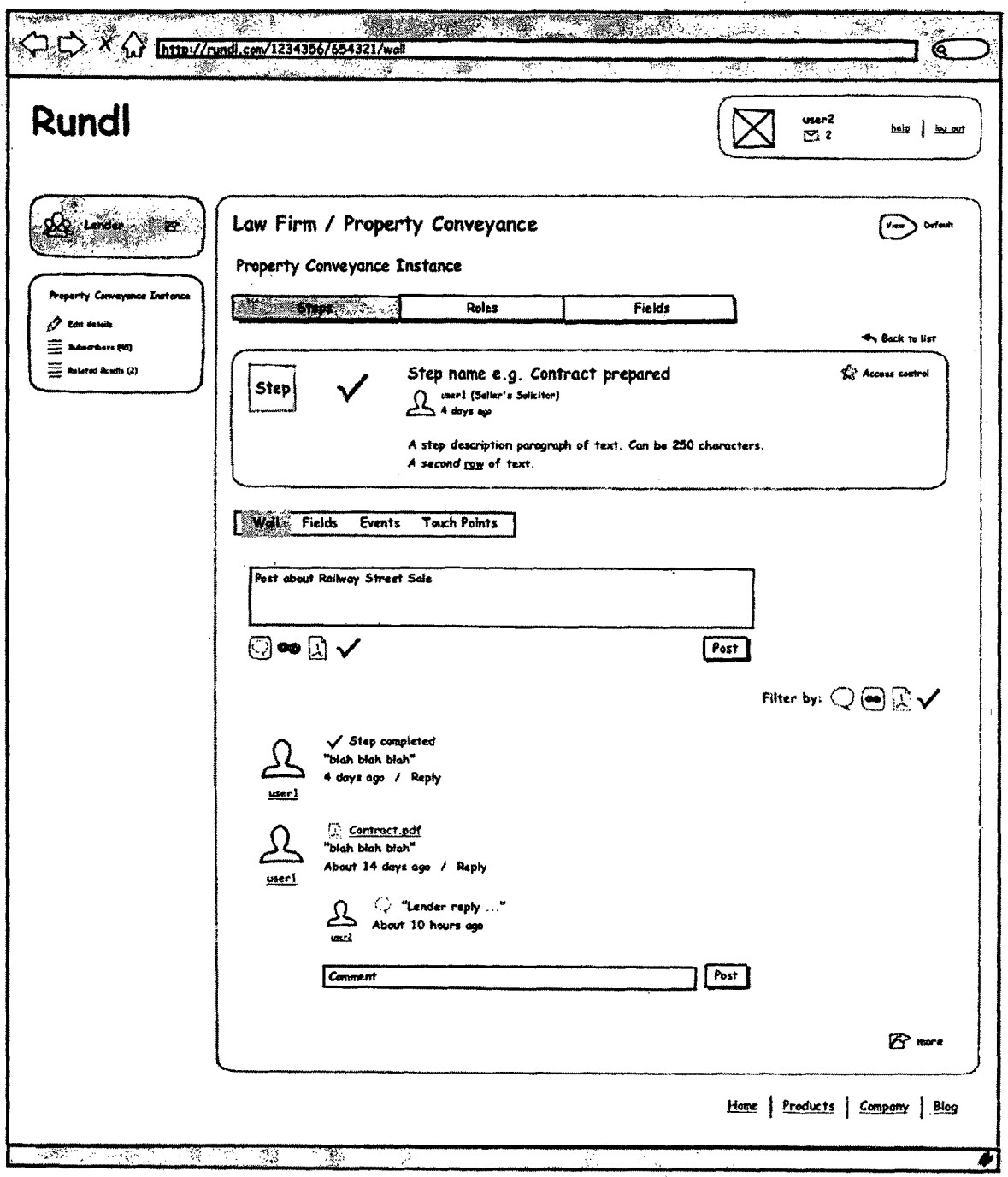
FIG. 14 is a user interface of the system for submitting and obtaining collaboration data associated with a step of a process instance.

The Lender User 1110 is now a Subscriber to the Property Conveyance process model and can now collaborate with the Law Firm User via the service 100. The Lender User can view events registered in the service by the matter application in a client 102. For example, due to an upcoming deadline the Lender needs to know the status of the law firm's process and turns to the service 100 for the status data, as shown in FIG. 12. An interface, as shown in FIG. 13, is generated by the service 100 for viewing the events in the client 102. The Lender User 1110 can see a representation of the overall process instance, and a summary of each particular step, such as the status of the step, when the step was last updated and who updated it. If the Lender User uses the interface to select the Prepare Contract step, the client 120 is served comments, and the User can post or reply to comments and download documents, as shown in FIG. 14.

Figure 15:
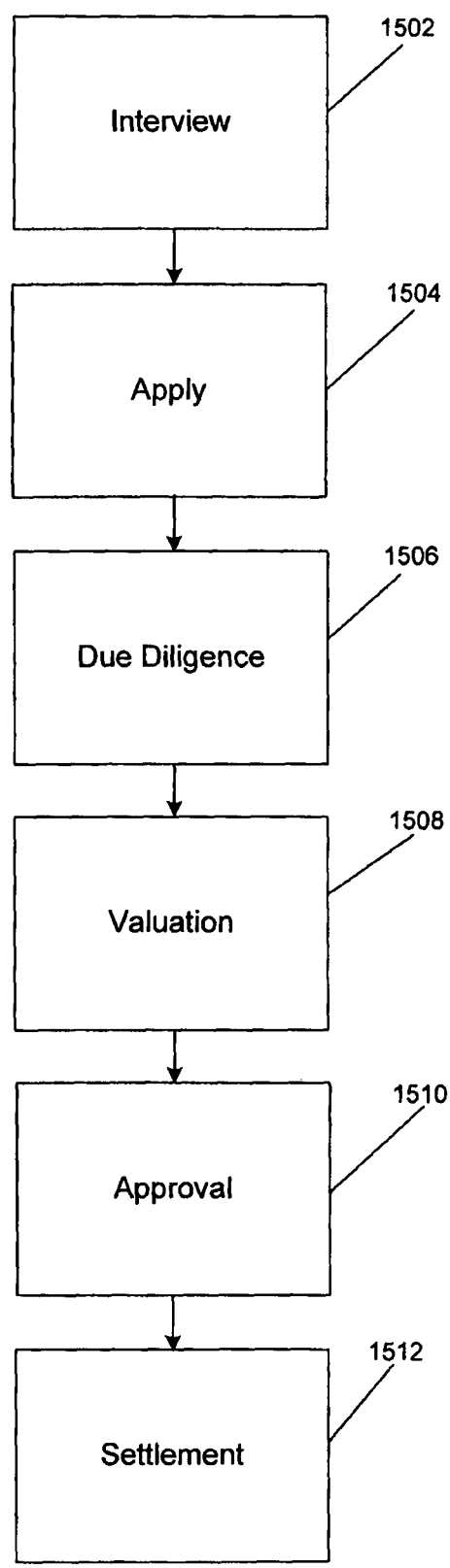
FIG. 15 is a flow diagram of a home loan approval process.
Figure 16:
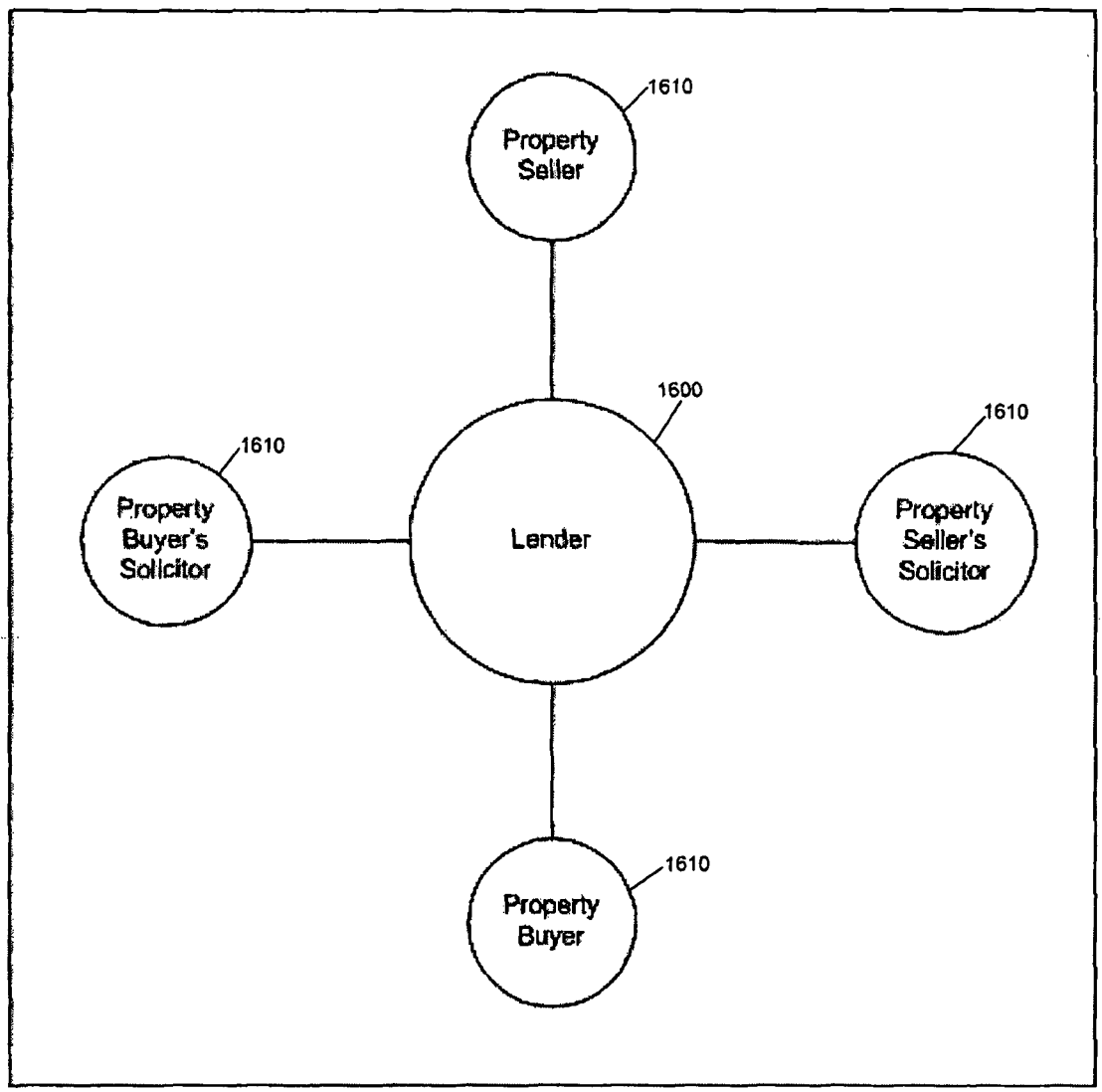
FIG. 16 is a diagram of users associated with a loan approval process.

The Lender User 1110 may also model and define their own process as part of the property conveyance task and collaborate with stakeholders in the process. For example the Lender User may use the collaboration system 100 to define a Home Loan Approval process, as shown in FIG. 15, which involves the steps of interview 1502, apply 1504, due diligence 1506, evaluation 1508, approval 1510, and settlement 1512. This process may only involve collaboration with the management systems of the stakeholders 1610 shown in FIG. 16, where the Lender 1600 is now shown as the hub, indicating it is the owner of the Home Loan Approval process.

As for the initial Law Firm User 802, a Lender User 1110 also goes through the steps of registering their users, initialising and storing their Home Loan Approval process model, reconfiguring their task management applications to operate as a client 102, and registering the operation of instances of their process and collaborating. At this stage, although the Law Firm Users can now collaborate with the Lender Users around their respective Property Conveyance and Home Loan Approval processes, the processes are completely independent.

Figure 17:
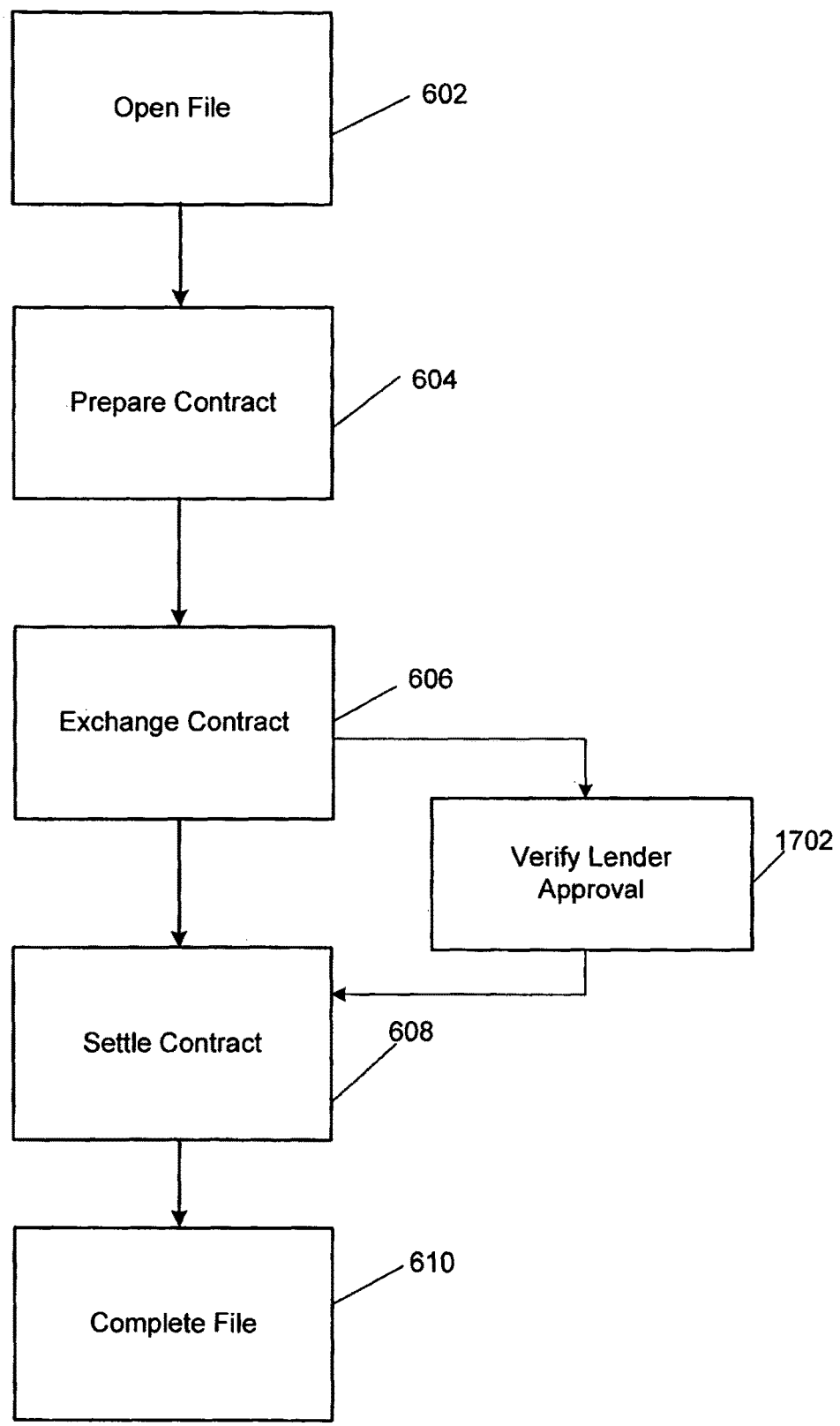
FIG. 17 is a flow diagram of an adjustment to the property conveyance process.

A Law Firm User may notice that the lender's Approval step 1510 of FIG. 15 "touches" the law firm's Settle Contract step 608 of FIG. 6, and that it is important the law firm does not complete the Settle Contract step 608 if the lender hasn't completed the Approval step 1510. In other words the two processes should be interdependent or associated. The Law Firm User could modify their process, as in FIG. 17, to include a step Verify Lender Approval 1702. Yet the collaboration service 100 allows the Law Firm process model to retain the same steps, and instead create a touch point to the Lender process.

The Law Firm User also realises that not all instances of the Property Conveyance process may include a lender: e.g. some buyers may pay in cash. In these cases the Verify Lender Approval step 1702 would be redundant. The Law Firm User is able to take advantage of the parallel process collaboration system 100 because it enables interdependent processes to be managed with touch points while maintaining the functional isolation/separation and independence of the processes.

Figure 18:
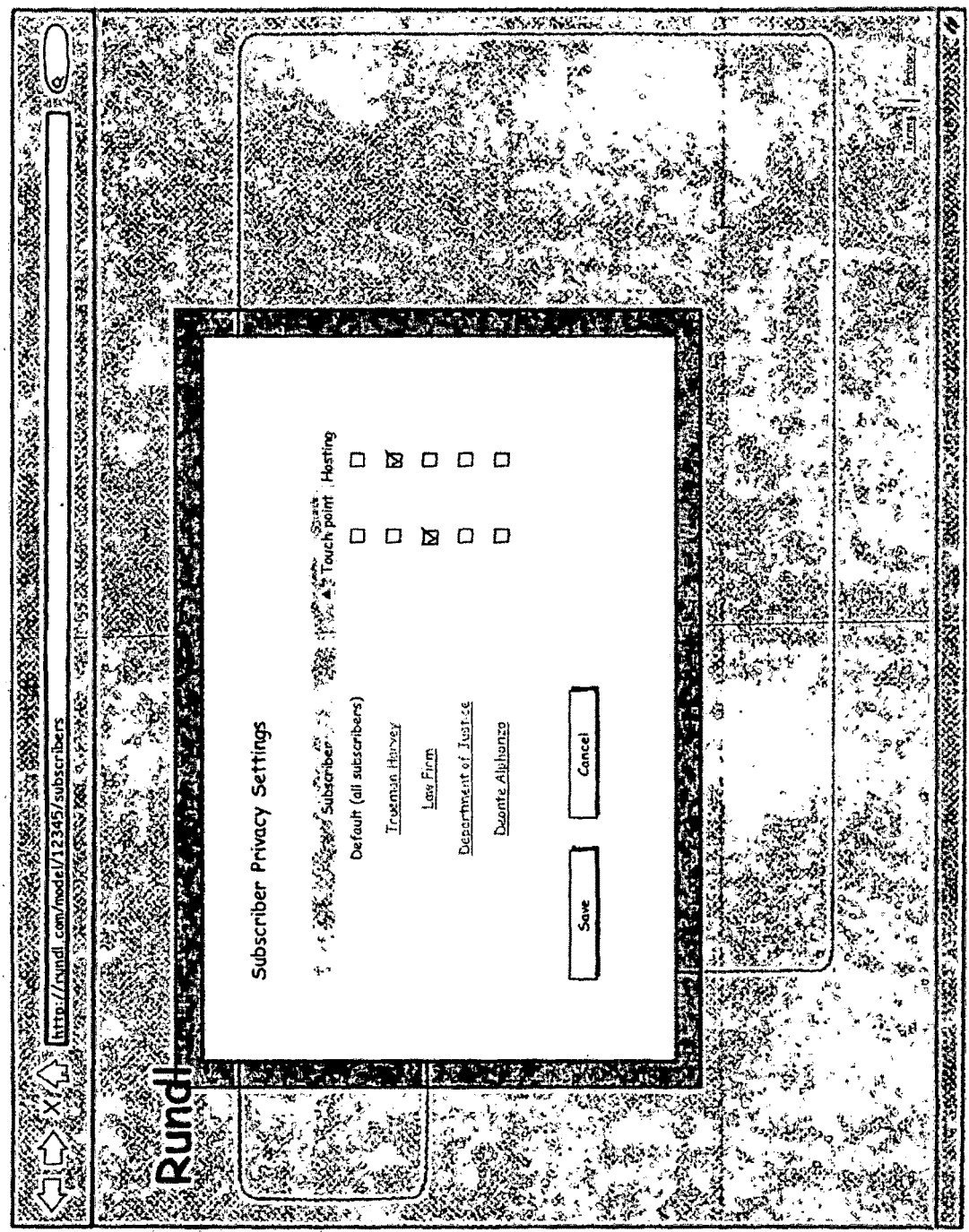
FIG. 18 is a user interface system for adjusting subscriber settings for creating touch points.

To create the touch point, the Law Firm User requests for the Law Firm Group to join the Network of the Lender's Group. The Lender User can accept the request on behalf of the Lender's Group and grant the permission. The Law Firm User, as a member of the Law Firm Group that is in the Lender's Network, can then browse the process models of the Lender's Group, including the Home Loan Approval process model. The Law Firm User can then, ask for the Law Firm Group to be a Subscriber to the Home Loan Approval process model, and on acceptance, the Lender User can set the privilege or privacy settings for the Subscriber using a served user interface, as shown in FIG. 18. Once the settings are saved, as shown in FIG. 18, this allows the Law Firm Subscriber to create touch points to steps of the Home Loan Approval process model of the Lender Group. The Law Firm User can then adjust his Group's Property Conveyance process model to create a touch point between the settled contract step 608 and the approval step 1510 of the Lender's process model.

In subsequent operation of an instance of the Home Loan Approval process model, a Lender User can add the Law Firm Group as a Subscriber to the Home Loan Approval instance. The Law Firm User then receives notification about the existence of a touch point between the Home Loan Approval process and Property Conveyance process. The Law Firm User is then able to select the related step of the related Property Conveyance instance to activate the touch point with the associated step of the Home Loan Approval instance and obtain the state of that step. Most task management applications generate a unique reference per matter, such as a case or job number, and as a client 102 the lender's task management application would expose such a reference via the service 100 so the law firm's matter application client can automatically activate the touch point and obtain data to advise completion of the Approval step.

Creating the touch point allows the law firm to maintain functional separation and independence of their process, but still collaborate with the lender. The Law Firm User did not need to create a Verify Lender Approval step 1702 in their Property Conveyance process in order to track the status of the approval. Instead Users can track the status directly, and are notified by the service 100. The law firm avoids the need to recreate data about the status of the lender's step in the instance. In addition, if the buyer is paying in cash there is no lender, so the touch point is not activated and the User can still complete the process independently. The independence of the defined processes also allows their steps to be complete in parallel or contemporaneously.

Figure 19:
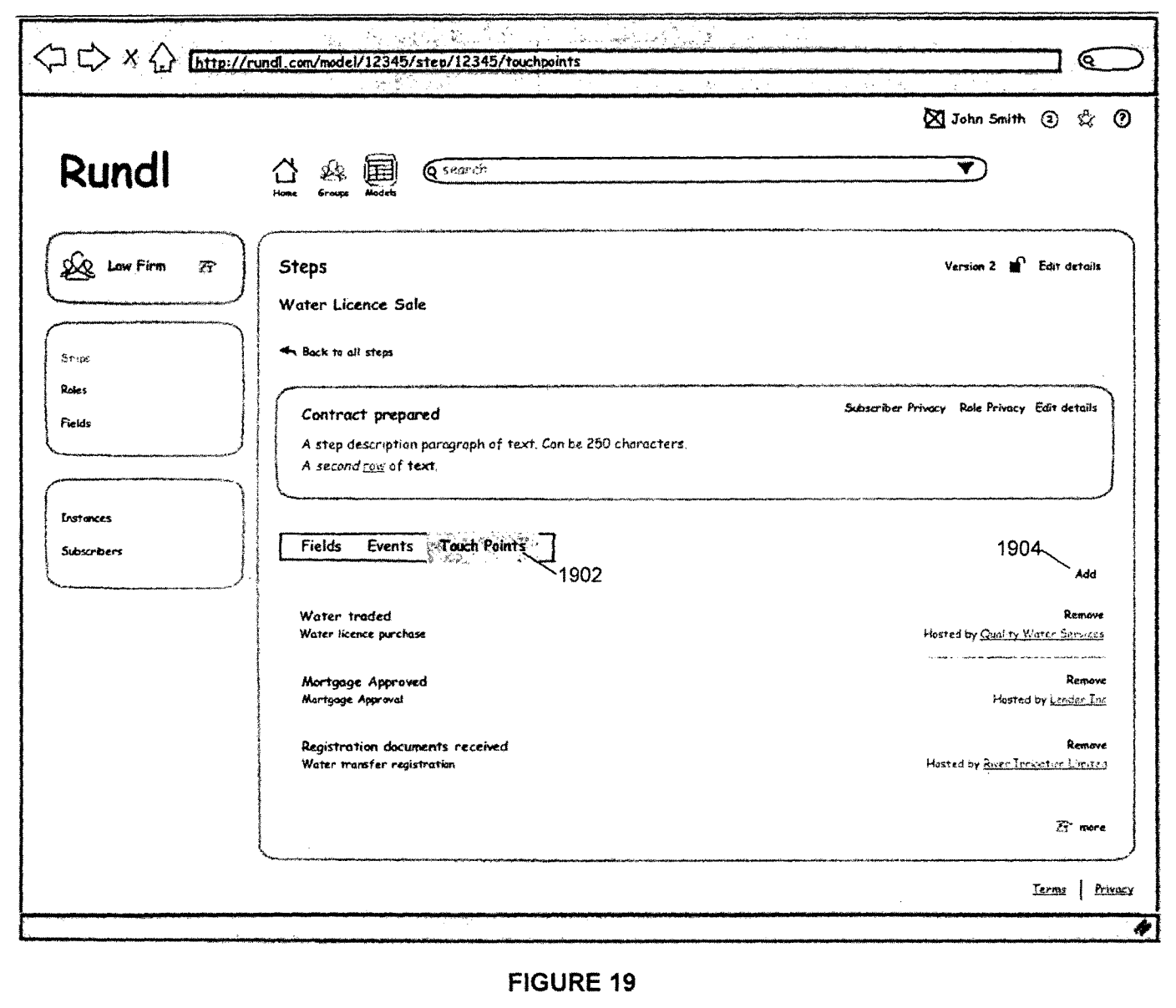
Figure 20:
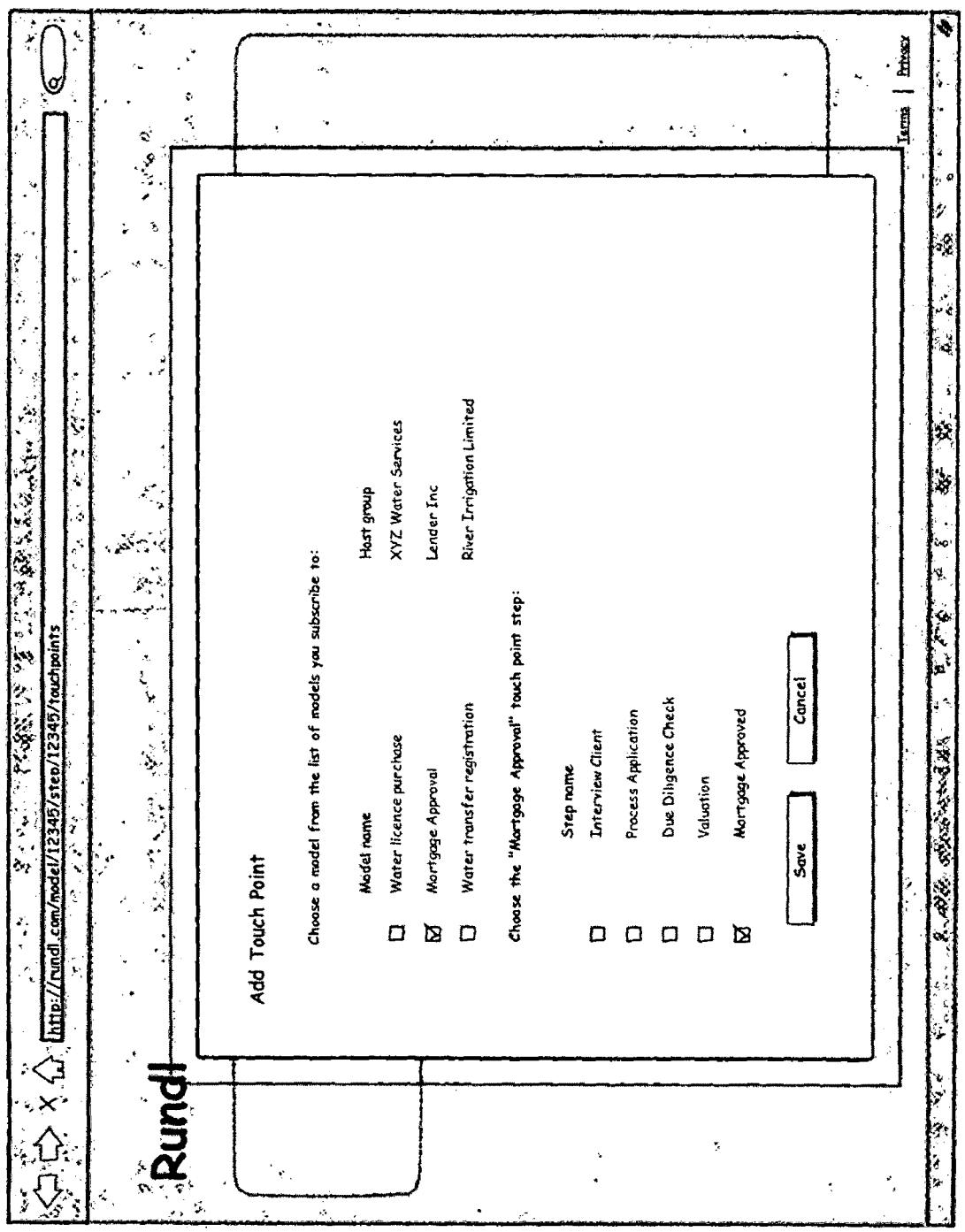
FIG. 20 is a user interface for creating a touch point.

The Initialise Process Model module 504 generates and serves user interface code to provide a user interface, as shown in FIGS. 19 and 20, to create touch points to selected steps of process models of different Groups. FIG. 19 illustrates a selected Contract Prepared step of a Water License Sale process model. The interface allows the fields, events and touch points of the selected step to be edited and adjusted. The Law Firm User, John Smith, has selected the touch point link 1902 of the Contract Prepared step, and this shows the three steps of three other models which have all been added as, or associated by, touch points and can be removed. When the touch point link 1902 of the interface is selected, an Add link 1904 can be selected to produce the touch point interface shown in FIG. 20. This shows the models to which the Group of the Law Firm User subscribes, and a model can be selected, in this case the Mortgage Approval model of a Group, Lender Inc. Once the model is selected, the steps of that model are then displayed and one of the steps can be selected and saved so as to create a touch point to that step, in this case the step Mortgage Approved of the model. FIG. 19 already shows that the Mortgage Approved step of the Mortgage Approval process model of Lender Inc has been added by a touch point so it is associated with and connected to the Contract Prepared step of the Water License Sale process model.

Figure 21:
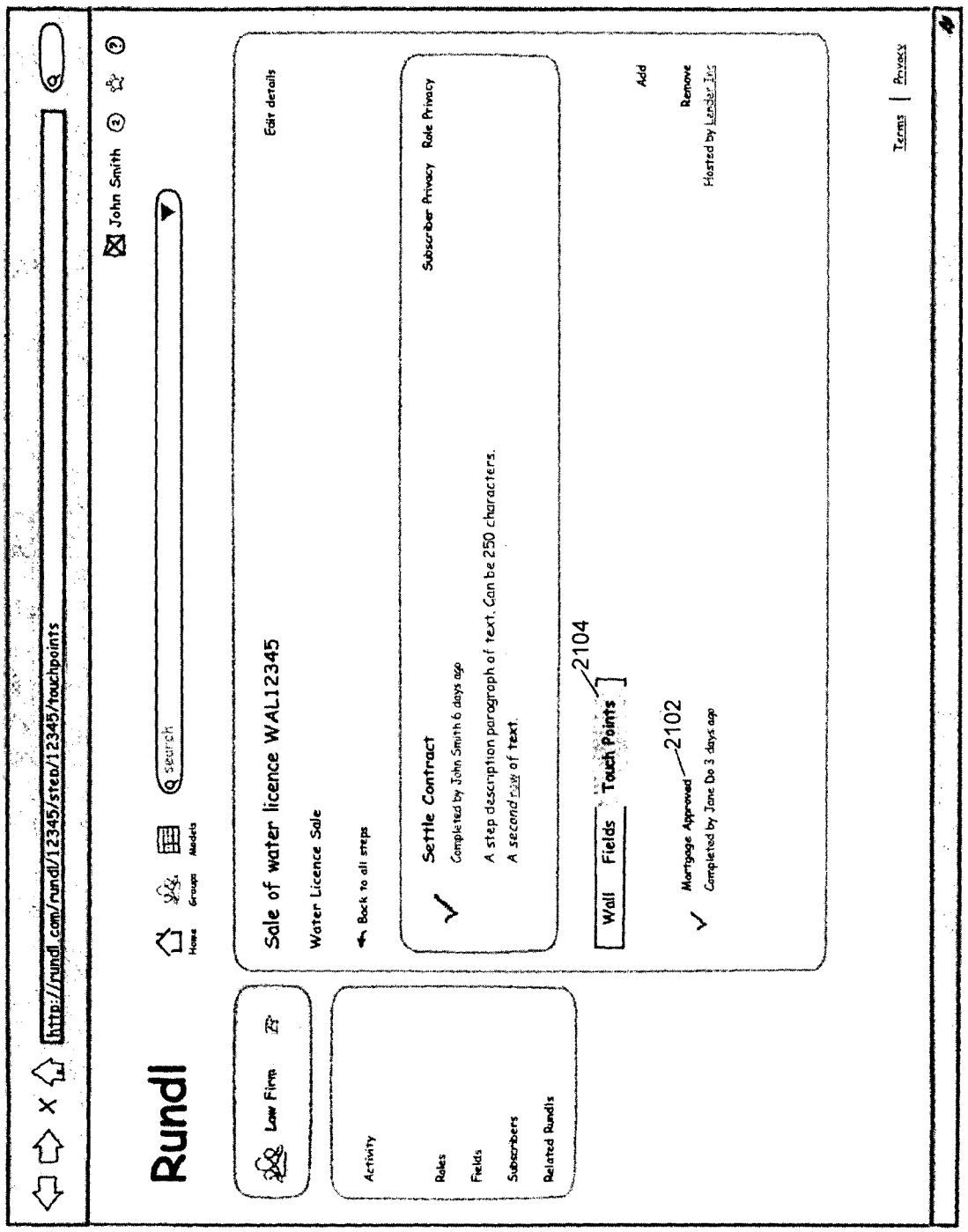
FIG. 21 is a user interface of the system for accessing touch points and state data associated with a step of a process instance.
Figure 22:
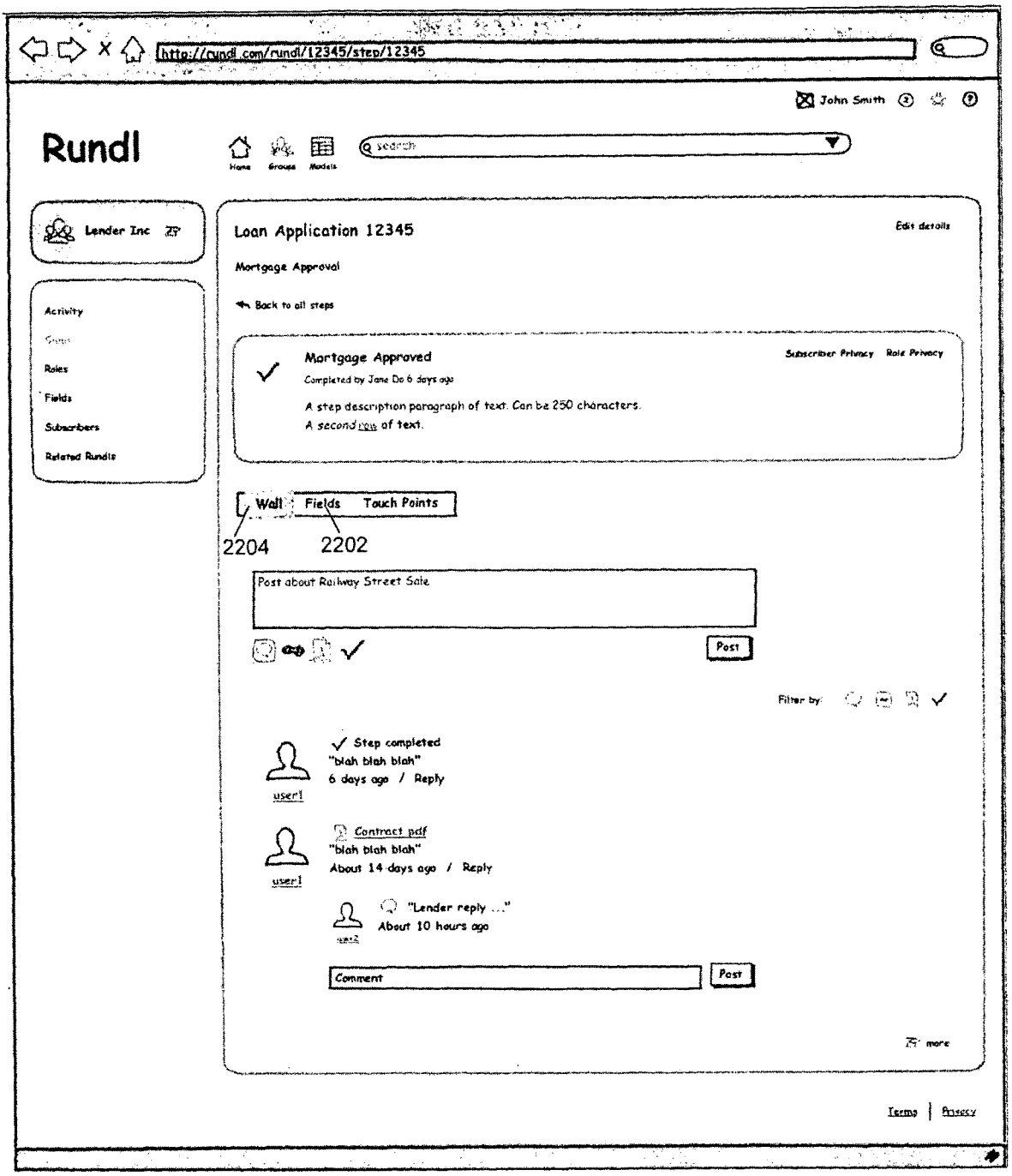
FIG. 22 is a user interface of the system for accessing data of a connected step of a touch point.
Figure 23:
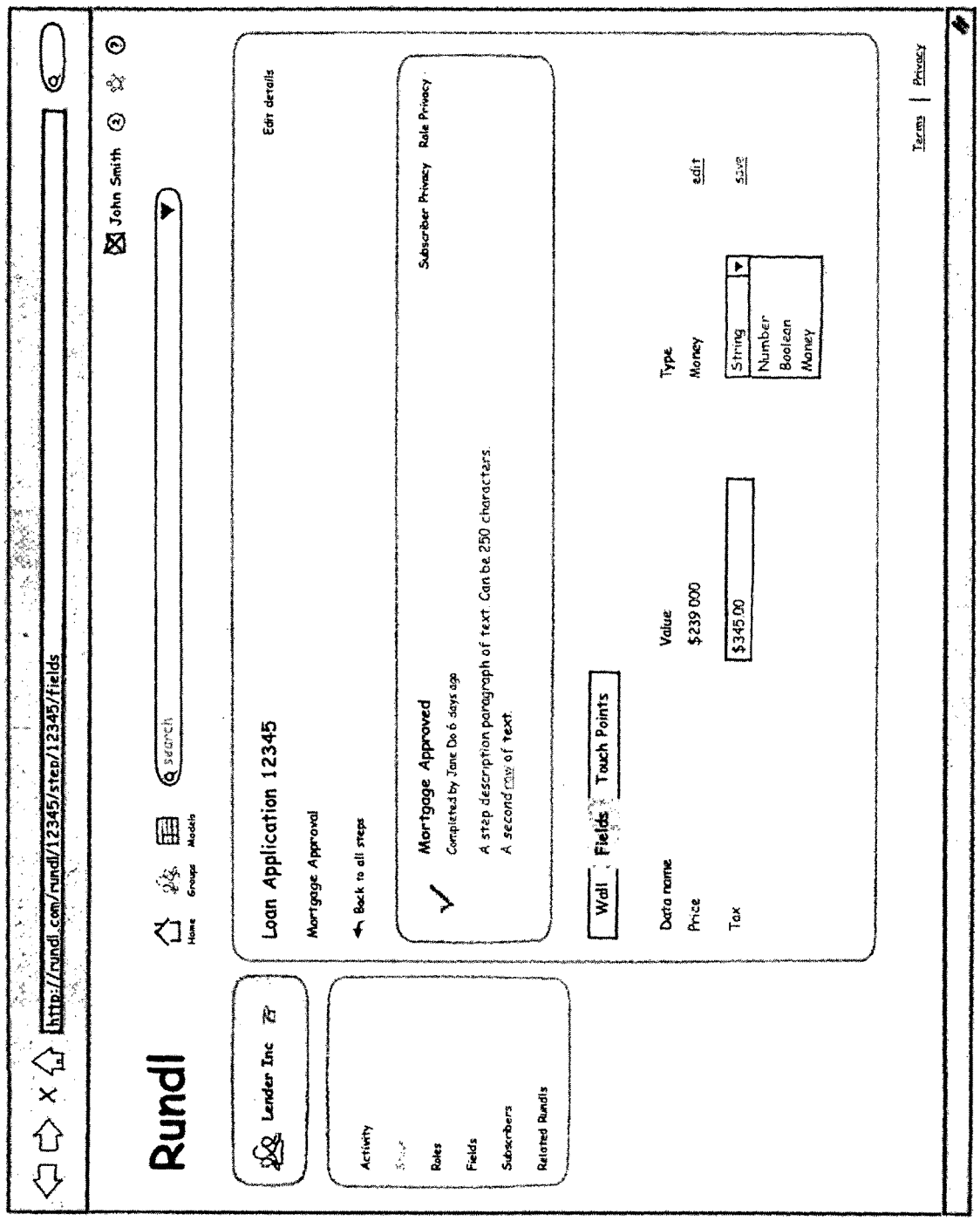
FIG. 23 is a user interface system for accessing field data of a connected step of a process instance.

When an instance of the Water License Sale process is invoked by a Law Firm User, the Operate Process Instance module 506 is used to generate and serve interfaces that enable the steps of the instance to have data associated with their current states presented for Users on selection. For example, as shown in FIG. 21, a Settle Contract step of a Water License Sale instance can be selected to produce the interface shown in FIG. 21 which shows that the step has been completed. While selecting the touch point link 2104 the status of all the steps associated by a touch point to the Settle Contract step also has their status displayed. In this case there is a touch point to a Mortgage Approved step of Lender Inc, and this shows in FIG. 21 that it has been completed. Further data can be obtained by the User by selecting on the Mortgage Approved step link 2102 that is displayed so as to serve the wall interface associated with the step, as shown in FIG. 22. This corresponds to the interface of FIG. 14 for a step of the Property Conveyance instance. On selecting the fields link 2202 instead of the wall link 2204, this causes the fields interface for the step to be displayed for the Law Firm User, as shown in FIG. 23, to provide a display of the current data for the data fields associated with the Mortgage Approved step of the Loan Application instance of the Lender Inc process. Accordingly, the Law Firm User is able to obtain all relevant data and status information concerning a step of an independent process associated with another Group, solely based on the touch point that has been created by a User of the Law Firm Group for their Water License Sale process model.

Figure 24:
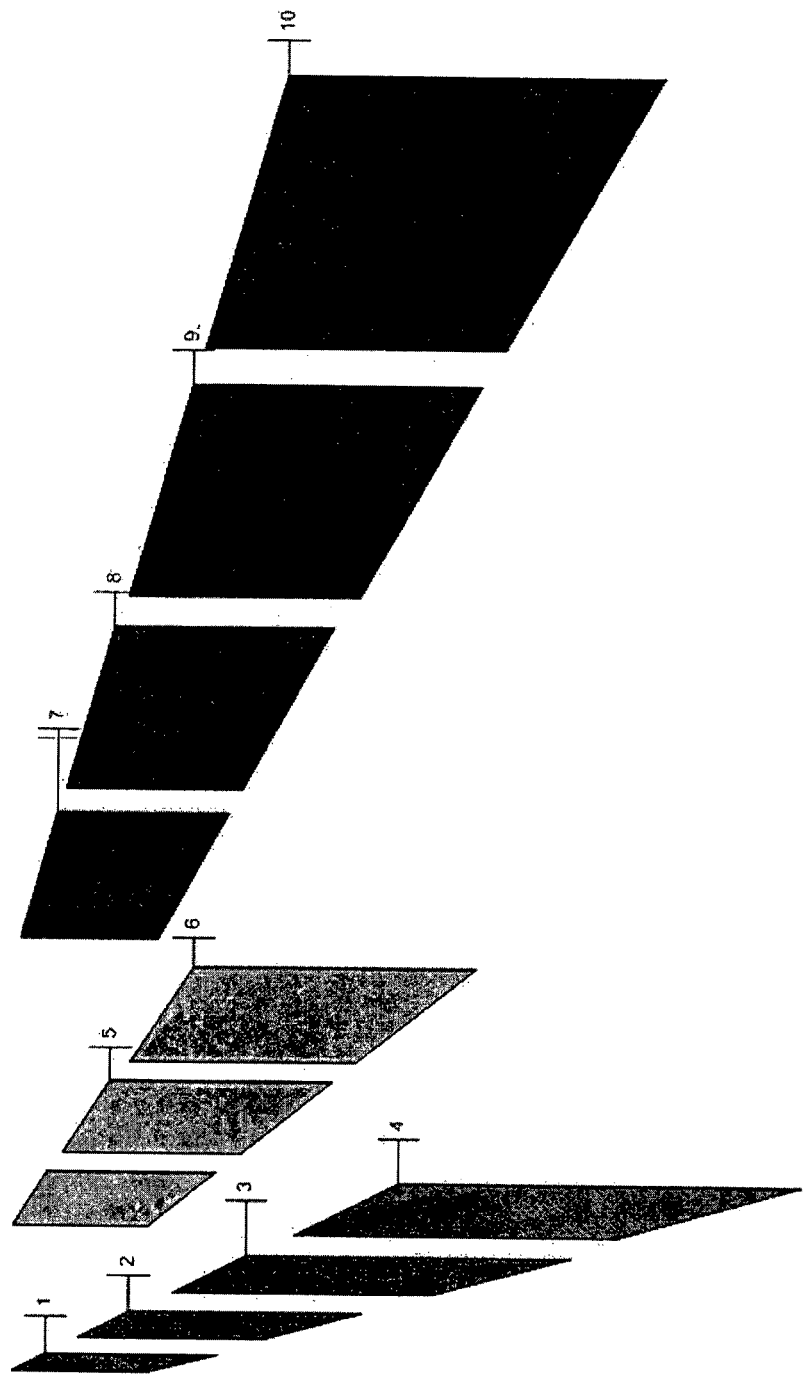
FIG. 24 is a diagram illustrating independent parallel processes.
Figure 25:
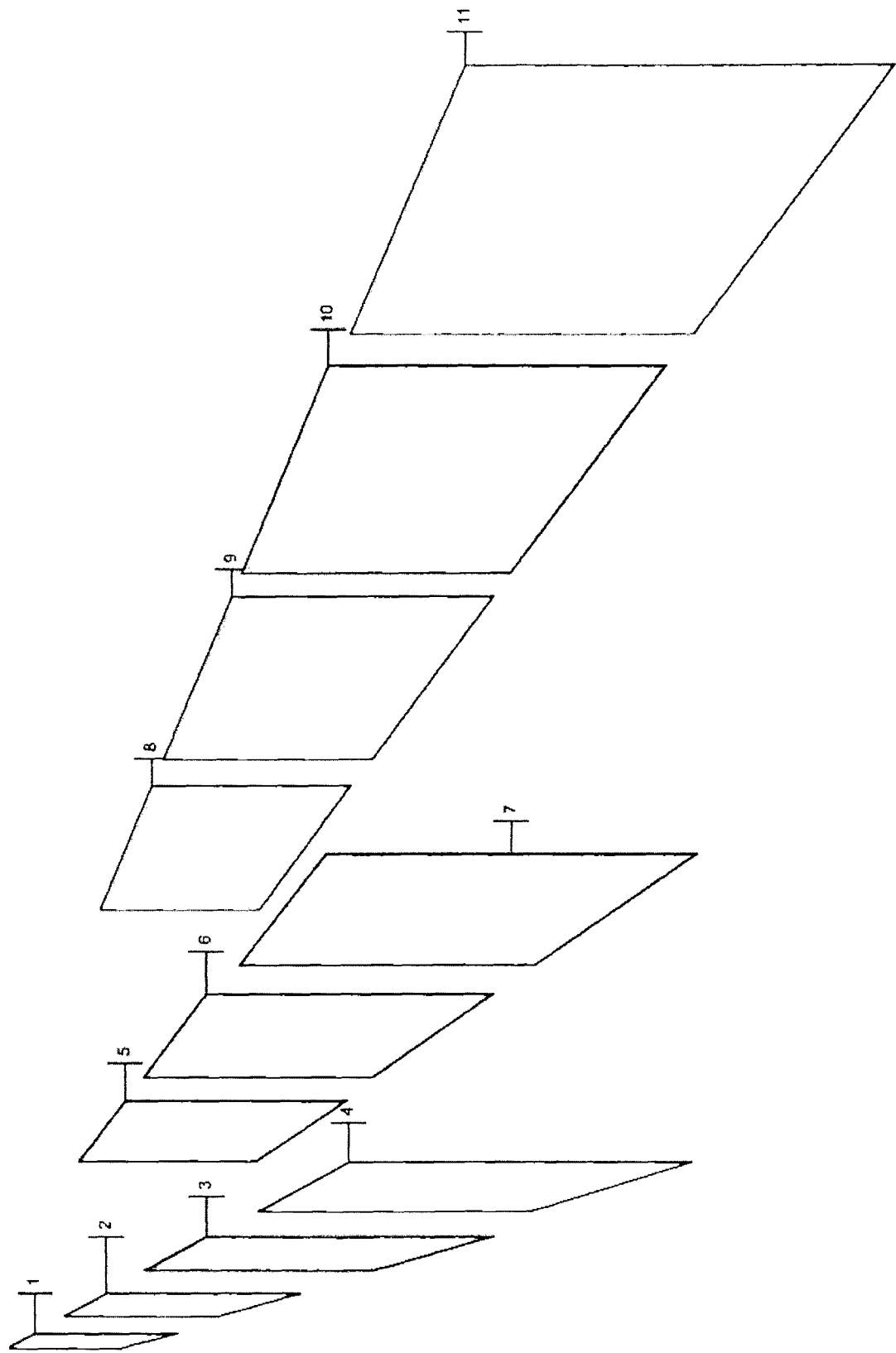
FIG. 25 is a diagram illustrating independent parallel processes with touch points.

FIG. 24 illustrates a situation where three different clients operate three independent processes, and there is no interaction or collaboration between them. Whereas, as shown in FIG. 25, the same three processes, with the use of the collaboration system 100, can be connected once touch point associations are created and stored. For instance, in FIG. 25, step 3 in the first process has a touch point with step 6 in the second process. Also, step 10 in the third process has a touch point with step 7 in the second process. Creating the touch point associations in the process models allows a network of parallel processes to grow from independent processes.

The service 100 allows a network of parallel processes to grow whilst the integrity of each individual process is intact. Process designers can focus on modelling their own processes, and related processes can be found and associated by touch point data of the service 100, rather than models redesigned and redeployed.

Due to the independence of the individual processes, the processes are tolerant to changes in any parallel process. If a touch point in a parallel process is removed, the process is itself unchanged. Also the parallel process can change and grow over time without impacting on the utility of the touch point to the process. Changes to the parallel process are available to the associated touch point process automatically as the parallel process changes. Steps of the processes also do not need to be completed sequentially.

Many modifications will be apparent to those skilled in the art without departing from the scope of the present invention.

What is claimed is:

1. A collaboration computer system, comprising:
a database system comprising data storage memory storing data comprising:
(i) user data representing users;
(ii) model data representing process models comprising at least a first process model of a first process and a second process model of a second process, the process models defining steps and associated users of each process; and
(iii) touch point data representing connections between steps of different independent processes, the different independent processes comprising at least the first process and the second process; and
(iv) state data associated with steps of instances of the different independent processes;
a processing system for communicating with the database system, the processing system comprising a microprocessor and further comprising:
(a) a user module to associate users with respective user data;
(b) a model module to generate user interfaces for users to create the process models and generate the model data, and associate processes to users, independently of other users; and
(c) an instance module to generate and operate at least a first instance of the first process and a second instance of the second process based on the process models and monitor state changes of the steps of the different independent processes in parallel based on the state data, and generate notification message data based on said touch point data on state change of a connected step.

2. The collaboration computer system as claimed in claim 1, wherein the model data defines events associated with respective steps of the first process and the second process, and the instance module adjusts the state data of step when at least one of the associated events occurs.

3. The collaboration computer system as claimed in claim 2, wherein the events of said steps occur independently and in parallel without a sequence.

4. The collaboration computer system as claimed in claim 2, further comprising a communication module to communicate with management computer systems associated with said users to obtain event data representing occurrence of said at least one of the associated events.

5. The collaboration computer system as claimed in claim 1, wherein said user data comprises group data representing groups and users associations with the groups as members, and the model data represents groups associated with each process.

6. The collaboration computer system as claimed in claim 5, wherein members of a group have access to said model data of a process model associated with the group and other users request to subscribe to process instances created from the process model associated with the group to obtain state data on steps of the process instances.

7. The collaboration computer system as claimed in claim 4, further comprising clients to access the user interfaces, and clients to operate as part of the management computer systems to generate event messages to invoke at least one of the first instance or the second instance.

8. The collaboration computer system as claimed in claim 7, wherein said user data comprises a privilege data set to enable a user to subscribe to a process of another user or group and to set said touch point data to create a touch point to a step of the subscribed process.

9. The collaboration computer system as claimed in claim 8, wherein the instance module provides a user interface to set said touch point data to add a touch point to one or more selected steps of a process instance.

10. The collaboration computer system as claimed in claim 9, wherein the user interface presents field events and touch points of a step of a process instance and displays steps of other process models which have been added as touch points.

11. The collaboration computer system as claimed in claim 10, wherein the user interface comprises a touch point selection which, when invoked for a step, shows a status of all the steps associated by a touch point to said step.

12. The collaboration computer system as claimed in claim 10, wherein the user interface comprises a field selection which, when invoked, displays current data for data fields associated with the step.

13. A collaboration computer system, comprising:
a microprocessor and data storage memory;
a model module to create and edit process models comprising at least a first process model representing a first process and a second process model representing a second process, wherein the first process and the second process are independent processes, and to establish data sharing relationships between pairs of steps of said independent processes; and
an instance module to invoke and operate parallel process instances in parallel based on the first process model and the second process model and to activate said relationships, said parallel process instances comprising at least a first process instance for the first process and a second process instance for the second process;
wherein users of said system are associated respectively with said parallel process instances and complete a task comprising steps of said parallel process instances using data shared between pairs of said steps.

14. The collaboration computer system as claimed in claim 13, further comprising:
a communication module to send event messages associated with events of steps of at least one of the first process or the second process to a management computer system; and
one or more clients comprising APIs installed on the management computer system to send event messages associated with said steps completed by users on the management computer system to said communication module.

15. The collaboration computer system as claimed in claim 14, wherein the process models are created to represent the respective independent processes performed respectively on the management computer system by the users.

16. The collaboration computer system as claimed in claim 13, wherein said data sharing relationships between said pairs comprises touch point data for a pair of said pairs, the touch point data associating a first step with a second step of the pair, and when a state of the first step changes, the instance module triggers a message notification to the second step.

17. A collaboration process, executed by a computer system, comprising:
generating a first process model for a first process and a second process model for a second process, wherein the first process model and the second process model represent independent processes;
generating touch point data representing relationships between steps of said independent processes respectively;
operating at least a first instance of the first process and a second instance of the second process in parallel based on the first process model and the second process model; and
activating data connections between steps of the first instance of the first process and steps of the second instance of the second process based on said touch point data.

18. The collaboration process as claimed in claim 17, further comprising generating at least one user interface to provide selective display of data fields associated with a process of the independent processes, events that occur in the process and a state of the events, and touch points based on said touch point data, to access data associated with the state of at least one step of another independent process.

19. The collaboration process as claimed in claim 18, wherein data for said data fields and said state of the events is obtained from event messages received from at least one management computer system communicating with the computer system executing the collaboration process.

* * * * *

UNITED STATES PATENT AND TRADEMARK OFFICE
CERTIFICATE OF CORRECTION

PATENT NO. : 11,042,514 B2
APPLICATION NO. : 14/240077
DATED : June 22, 2021
INVENTOR(S) : Graeme Perkins Page 1 of 1

It is certified that error appears in the above-identified patent and that said Letters Patent is hereby corrected as shown below:

On the Title Page

The assignee should be added as follows:
(73) Assignee: RUNDL PTY LTD., Prahran, Victoria, Australia Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*